(12) United States Patent
Curran et al.

(10) Patent No.: US 7,069,931 B2
(45) Date of Patent: *Jul. 4, 2006

(54) METHOD OF MAKING A FILTERING FACE MASK THAT HAS AN EXHALATION VALVE ATTACHED THERETO

(75) Inventors: Desmond T. Curran, Durham (GB); Elfed I. Williams, Swansea (GB)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 11/185,077

(22) Filed: Jul. 20, 2005

(65) Prior Publication Data
US 2005/0252839 A1    Nov. 17, 2005

Related U.S. Application Data

(63) Continuation of application No. 09/871,223, filed on May 31, 2001, now Pat. No. 6,959,709, which is a continuation of application No. 09/420,671, filed on Oct. 19, 1999, now Pat. No. 6,604,524.

(51) Int. Cl.
*A62B 7/10* (2006.01)

(52) U.S. Cl. .................. 128/206.19; 128/207.12; 128/205.27

(58) Field of Classification Search .......... 128/205.27, 128/206.15, 206.19, 207.11, 207.12, 205.29, 128/206.13; 29/512; 403/274; 227/52, 227/62, 77
See application file for complete search history.

(56) References Cited

U.S. PATENT DOCUMENTS

| | | | |
|---|---|---|---|
| 521,825 A | 6/1894 | Shipe |
| 719,314 A | 1/1903 | Eaton |
| 1,092,554 A | 4/1914 | Abbott |
| 1,101,756 A | 6/1914 | Nesvadba |
| 1,122,280 A | 12/1914 | Kempshall |
| 1,440,308 A | 12/1922 | Maloy |
| 1,591,183 A | 7/1926 | Reynolds |
| 1,748,951 A | 3/1930 | Gookin |
| 2,087,969 A | 7/1937 | Gookin |
| 2,114,358 A | 4/1938 | Schwartz |
| 2,131,347 A | 9/1938 | Fenton |
| 2,160,317 A | 5/1939 | Schwartz |
| 2,181,026 A | 11/1939 | Schwartz |
| 2,238,964 A | 4/1941 | Benas |
| 2,341,566 A | 2/1944 | Monro |

(Continued)

FOREIGN PATENT DOCUMENTS

GB    2072516    7/1990

(Continued)

OTHER PUBLICATIONS

Portions of box of 10 Moldex-Metric Series 27000 Respirators.

(Continued)

*Primary Examiner*—Aaron J. Lewis
(74) *Attorney, Agent, or Firm*—Karl G. Hanson; David R. Cleveland

(57) ABSTRACT

A method for making a filtering face mask that comprises providing a fluid-permeable multi-layered mask body comprising a structural supporting layer and a filtration layer, the multi-layered mask body being configured to fit over the nose and mouth of a person and having an aperture disposed therein; providing an exhalation valve comprising a base portion and a deformable hollow plastic extension member that extends from the base portion to a tip; inserting the tip through the aperture; and deforming the extension member so as to make an effective seal between the exhalation valve and the mask body.

22 Claims, 13 Drawing Sheets

U.S. PATENT DOCUMENTS

| | | | |
|---|---|---|---|
| 2,457,343 A | 12/1948 | Braunschweiger |
| 2,550,788 A | 5/1951 | Swart |
| 2,776,055 A | 1/1957 | Adler |
| 3,003,499 A | 10/1961 | Timm et al. |
| 3,332,473 A | 7/1967 | Frederickson et al. |
| 3,512,224 A | 5/1970 | Newton |
| 3,777,966 A | 12/1973 | Green |
| 3,890,695 A | 6/1975 | Gaastra |
| 3,934,569 A | 1/1976 | Bobene |
| 3,940,837 A | 3/1976 | Wiese |
| 3,949,716 A | 4/1976 | Liu |
| 4,111,813 A | 9/1978 | Preus |
| 4,178,034 A | 12/1979 | Mittendorf |
| 4,180,899 A | 1/1980 | Mikosinski |
| 4,215,682 A | 8/1980 | Kubik et al. |
| 4,273,119 A | 6/1981 | Marchello |
| 4,419,993 A | 12/1983 | Petersen |
| 4,454,881 A | 6/1984 | Huber et al. |
| 4,592,815 A | 6/1986 | Nakao |
| 4,726,365 A | 2/1988 | Jablonski |
| 4,765,177 A | 8/1988 | Pendleton et al. |
| 4,807,619 A | 2/1989 | Dyrud et al. |
| 4,827,924 A | 5/1989 | Japuntich |
| 4,828,694 A | 5/1989 | Leason |
| 4,874,399 A | 10/1989 | Reed et al. |
| 4,909,434 A | 3/1990 | Jones et al. |
| 4,934,362 A | 6/1990 | Braun |
| 4,974,586 A | 12/1990 | Wandel et al. |
| 5,025,052 A | 6/1991 | Crater et al. |
| 5,080,094 A | 1/1992 | Tayebi |
| 5,099,026 A | 3/1992 | Crater et al. |
| 5,125,886 A | 6/1992 | Dirksing |
| 5,169,374 A | 12/1992 | Abrams et al. |
| 5,199,635 A | 4/1993 | Abrams et al. |
| 5,307,796 A | 5/1994 | Kronzer et al. |
| 5,325,892 A | 7/1994 | Japuntich et al. |
| 5,325,893 A | 7/1994 | Takagi et al. |
| 5,348,182 A | 9/1994 | Luch |
| 5,374,458 A | 12/1994 | Burgio |
| 5,411,576 A | 5/1995 | Jones et al. |
| 5,472,481 A | 12/1995 | Jones et al. |
| 5,496,507 A | 3/1996 | Angadjivand et al. |
| 5,558,089 A | 9/1996 | Castiglione |
| 5,666,950 A | 9/1997 | Smith |
| 5,680,893 A | 10/1997 | Neer |
| 5,682,879 A | 11/1997 | Bowers |
| 5,697,105 A | 12/1997 | White |
| 5,706,804 A | 1/1998 | Baumann et al. |
| 5,724,677 A | 3/1998 | Bryant et al. |
| 5,848,590 A | 12/1998 | Smith |
| 5,967,142 A | 10/1999 | Dorcheh et al. |
| 6,047,698 A | 4/2000 | Magidson et al. |
| 6,070,736 A | 6/2000 | Ballman et al. |
| 6,584,976 B1 | 7/2003 | Japuntich et al. |
| 6,604,524 B1 * | 8/2003 | Curran et al. ......... 128/206.15 |
| 6,959,709 B1 * | 11/2005 | Curran et al. ......... 128/205.29 |

FOREIGN PATENT DOCUMENTS

| | | |
|---|---|---|
| WO | WO 96/11594 | 4/1996 |
| WO | WO 96/28217 | 9/1996 |
| WO | WO 99/24119 | 5/1999 |

OTHER PUBLICATIONS

Moldex 2701 N95 Series product brochure (Sep. 1998).

Moldex-Metric, Inc. letter to distributors (Dec. 16, 1998).

* cited by examiner

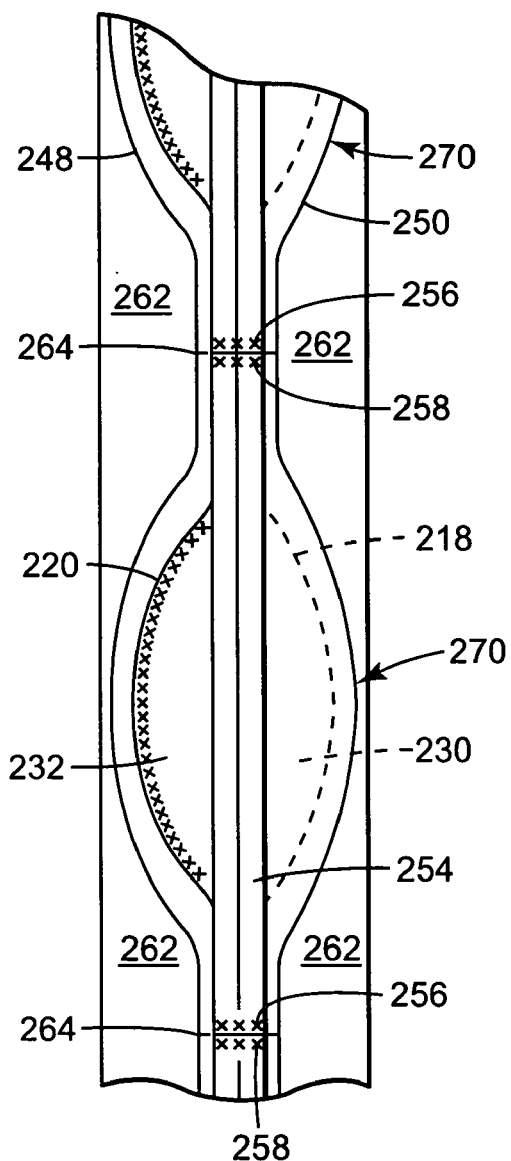
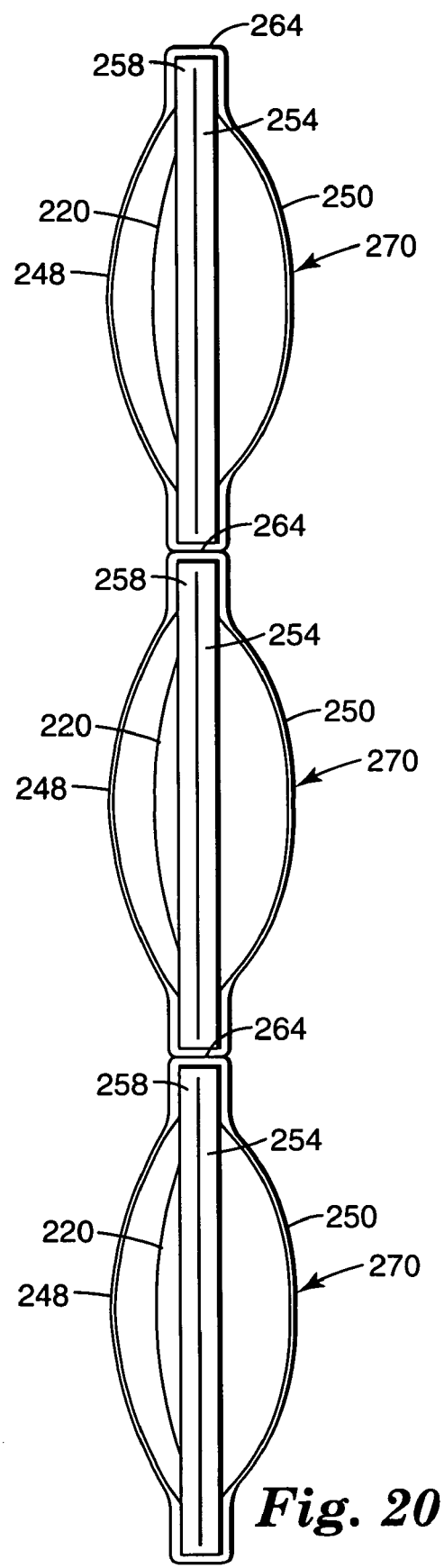
Fig. 19
Fig. 20

METHOD OF MAKING A FILTERING FACE MASK THAT HAS AN EXHALATION VALVE ATTACHED THERETO

This application is a continuation of U.S. Ser. No. 09/871,223, filed May 31, 2001 now U.S. Pat. No. 6,959,709, now allowed, which is a continuation of U.S. Ser. No. 09/420,671 filed Oct. 19, 1999 (U.S. Pat. No. 6,604,524), the disclosure of which is herein incorporated by reference.

TECHNICAL FIELD

The present invention relates to a technique for attaching one or more component elements to filtration material including such material of the type that is particularly suitable for use in the making of respiratory masks. Specifically, the present invention relates to methods of attaching one or more components to filtration material, wherein a preferred method is one that is also suitable for automated production as part of a high speed manufacturing system. The present invention also relates to the combination of filtration material with a component that is attached together in accordance with the method of the present invention. Typical components attached to respiratory masks, for example, include valves, headbands, and the like.

BACKGROUND

Filtration material may be incorporated within any number of different types of filters and/or may be formed or otherwise constructed into filtration devices. In any case, it may be desirable to attach a component element to the filtration material in order to facilitate the incorporation of the filtration material with other elements or in constructing the filter material as a filtration device. Filtration material itself typically comprises a media capable of permitting fluid flow through the media but defining orifices or passages through the media which limit the passage of particulate matter or the like through the filter media. Such media may otherwise be designed for removing any constituent component of a fluid from the fluid as it passes The present invention was developed, in particular, for the production of respiratory masks that are utilized in a wide variety of applications for protecting a user's respiratory system from contaminates and/or unpleasant or obnoxious gases within the air. Moreover, medical care providers utilize such respiratory masks for preventing the spread of harmful microorganisms either to or from the provider.

Various forms of respiratory mask are commercially available; some of which are categorized as "disposable" because they are intended to be used for relatively short periods of time. Other non-disposable respiratory masks may include replaceable filters even though the masks themselves are reusable. Disposable masks typically have a mask body that is formed predominantly from an air filtration material and that is shaped or configurable to fit over at least the nose and mouth of a person. Replacement filters for non-disposable masks typically include a layer of air filtration material along with certain structural components whereby the filter is connectable with the reusable mask.

Disposable respiratory masks can be generally classified into one of several categories, some of which are noted as follows: 1) flexible flat masks that are sometimes folded or pleated and that are sized to fit relatively flatly over a person's nose and mouth; 2) foldable masks that can be folded in a flat state and unfolded into a cup-like usable state where it can fit over a person's nose and mouth and; 3) molded masks that are pre-shaped into their usable state. Of these, either type of the fold-flat masks can be packed flat and may be provided with appropriate seams, pleats and/or folds to accommodate usage. The foldable type masks that can be unfolded into a cup-like state are usually formed with panels that are defined by seams, pleats and/or folds that enable the mask to be opened into the generally cup-shaped configuration. Molded masks, on the other hand, are preformed into a desired face-fitting configuration and generally retain that configuration during use. When a fold-flat or molded mask is in use, the mask body forms a breathing zone to at least some degree around at least the nose and mouth of the wearer. Air is drawn into the breathing zone through the air filtration material when the wearer inhales.

Disposable respiratory masks generally incorporate at least one attached component that is attached to or through a layer of filtration material or composite material having a layer of filtration material. For example, almost all such masks include a headband, ties or other means by which the mask can be secured to the user's head. Furthermore, such masks also are known to incorporate other attached components including valves, nose clips and face shields.

Some methods that are frequently employed for attaching such components are based upon the use of thermal welding or ultrasonic welding, such as described, for example, in U.S. Pat. No. 5,325,893. These methods are advantageous in that they can attach such a component in a way such that the component is effectively sealed with the filtration material. That is, because the welding can be done all the way around the component, the filtration material, which is likely a fibrous material, can be thermoplastically welded with itself and the component. Thus, the component can be sealed to the filtration material so that the filtering affect of the filtration material is not compromised at the attachment interface. However, welding techniques are generally more costly and complex than others in that they require the provision of relatively complex equipment for conducting the ultrasonic or thermal process, and, especially where fibrous material is connected with a component, requires a sufficient control system to make sure that a good attachment results.

Alternatively, for some components and other forms of respirators, adhesive bonding is known to be used. The benefit of adhesive bonding is that, like welding, an effective attachment can be more easily provided. That is, as long as the adhesive is compatible with both the filtration material and the component, it can be applied all the way about the component to create a good attachment. The seal created by the attachment, however, is enhanced only where the adhesive is applied. That is, an external layer (which may be filtration material or otherwise) may be attached and sealed with the component by the adhesive, but other layers may not be sealed with one another, the external layer, or the component. As such, a good seal (i.e. one that doesn't permit larger particles to pass than is the function of the filter, for example) may be compromised. In any case, such an adhesive attachment technique requires the added expense of the adhesive and further requires the provision of a means to dispense and control the application of the adhesive. This adds cost and complexity.

In other situations, mechanical clamping techniques are also known, including the use of fasteners like staples or other clamping structure. Such mechanical systems have the general advantage that they do not require complex bonding equipment such as thermal and/or ultrasonic generators and controls or adhesive dispensing and applying devices and controls. However, a mechanical clamping system itself may require complex alignment and control mechanisms. Examples of mechanical attachment techniques are disclosed in U.S. Pat. Nos. 5,374,458 and 5,080,094 and in published international applications WO 96/11594 and 96/28217. The biggest concern when utilizing a mechanical fastener or clamping system is the creation of an effective seal, i.e. one that will not permit a significant quantity of any contaminant to pass that is otherwise intended to be excluded by the filtration material to which the component is attached. This problem may vary depending on where on the mask, for example, the component is attached (such as, for example, directly in front of the user's nose as contrasted with a point off to the side). Moreover, certain mechanical clamping methods may not only require the provision of an additional fastening component, but also may also require additional alignment and fastener or clamp manipulation steps.

These attachment methods are also employed in other fields when it is necessary to secure components to fluid filtration material, for example in the manufacture of air filters, such as vacuum cleaner bags, and oil filters. An example of a mechanical clamping technique used outside the field of fluid filtration is disclosed in U.S. Pat. Nos. 4,909,434; 5,125,886 and 5,199,635 where mechanical clamping is used to secure a pour spout to a liquid container (in some cases in combination with heat sealing).

SUMMARY OF THE PRESENT INVENTION

The present invention overcomes the deficiencies and shortcomings of the prior art by providing a mechanical attachment technique that is suitable for attaching components to filtration material and for creating an effective seal between the filtration material and the component. Moreover, the present invention includes such a technique that can be accomplished as part of an inline production system and that is particularly usable in high-speed production lines.

Moreover, a method of the present invention utilizes a component that is to be attached to the filtration material that has a base side and an extension member that is used in clamping the component to the filtration material by passing the extension member through the filtration material and having at least some portion thereof in contact with the filtration material or a composite material containing filtration material on the other side of the material from the base side thereof. Preferably, the extension member is in contact with the other side of the material all of the way around an opening that is provided through the material and through which the extension member passes so as to create an effective seal completely about the component.

The method of the present invention includes a step of inserting the extension member of the component through the opening of the material and thereafter performing a deforming step for causing the extension member to be deformed to have a surface thereof in sufficient contact with the material so as to make an effective seal between the component and the material. Preferably, the material is at least partially compressed between the deformed surface and the base of the component during the deforming step so that an effective seal is enhanced, especially where the filtration material is a composite web that comprises more than one layer (so that the plural layers also seal to one another).

Such a technique and method of attaching a component to filtration material is particularly advantageous in that the components can be relatively easily attached to such filtration material by a mechanical clamping arrangement that is effective for providing an effective seal with the filtration material with a minimum of system complexity. The method of the present invention does not require the provision of any additional component that has to be handled and positioned in addition to the component since the extension member is positioned at the same time that the component is positioned to the filtration material. Preferably, the extension member is made integrally with the component. The deformation step can be conducted as a cold forming process without the addition of heat or as part of a thermal or heat forming process depending on the material from which the extension portion of the component is made. The method of the present invention is particularly adaptable for use as part of an inline production system that may be conducted at relatively high speeds.

More especially, the present invention is concerned with providing an alternative method of attaching a component, for example an exhalation valve, to air filtration material forming part of a respiratory mask.

The aforementioned advantages of the present invention can be achieved by providing a component and a web comprising filtration material, wherein the component is attached to the web that includes first and second major surfaces and an aperture; and the component comprises a base that is located against the first major surface of the material and an extension member that extends from the base through the aperture and has a deformed portion thereof that has been turned back toward the base portion with at least a part thereof located against the second major surface of the fluid filtration material so as to mechanically clamp the component in fluid-tight relationship to the material. Preferably, the filtration material is at least somewhat compressed in the attached state of the component and web.

The present invention also provides a method of manufacturing a web and component combination as set out above, wherein the method comprises the steps of providing a web comprising a layer of filtration material, the web having first and second major surfaces and an aperture, providing a component that comprises a base and a deformable extension member that extends from the base, positioning the base of the component against the first major surface of the web with the extension member extending through the aperture, and then deforming the extension member back toward the base so that at least a part of the extension member abuts against the second major surface of the web and clamps the component in fluid-tight relationship to the material.

BRIEF DESCRIPTION OF THE DRAWINGS

FIG. 5A shows a component positioned within an opening provided through a layer of filtration material, the component also including a central opening and an extension member surrounding the central opening by which the component is to be attached to the filtration material, and a forming punch and die arrangement in a completely open state with the die positioned to support the component and to extend within the central opening of the component and the punch spaced away from the extension member of the component; FIG. 5B shows the component positioned through the filtration material with the punch advanced so as to contact and begin deforming the extension member of the component; FIG. 5C shows the component position through the filtration material with the punch further advanced so as to contact a stop portion of the die and with the extension member of the component further deformed; FIG. 5D shows the component positioned through the filtration material with the punch contacting the die and a second component of the punch advanced further for bending the extension member back toward the component; and FIG. 5E shows the component positioned through and attached to the filtration material by the further advance of the second component of the punch whereby the extension member is deformed sufficiently back toward the component, and so that at least a surface portion of the deformed extension member abuts against the filtration material to provide a mechanical clamping of the component to the filtration material;

FIG. 19 is a partial back view of the materials in making the respiratory masks in accordance with the process of FIG. 16 with the respiratory masks substantially formed and with headband material positioned on and connected with the respiratory masks;

FIG. 20 is a partial back view of a plurality of respiratory masks that have been formed in accordance with a process of FIG. 16 and with the respiratory masks fully formed but still attached to one another;

DETAILED DESCRIPTION OF THE PREFERRED EMBODIMENTS

With reference to the drawings, wherein like components are labeled with like numerals throughout the several figures, a manner of attaching a component 10 to a portion of any length of filtration material 12 is illustrated in FIGS. 1–5. Filtration material 12 is illustrated to represent any known filtration material, the purpose of which is to remove any constituent portion of a fluid to be filtered from the fluid as the fluid passes through the filtration material, including filtration materials that contain only one or more than one filter layer. Moreover, the illustrated layer of filtration material 12 is meant to include composite webs that incorporate filtration material (one or more filter layers) with other structure and/or in combination with additional layers other than filter layers. The component 10 can be any component for which attachment to the filtration material 12 is desired, and typically comprises an element that adds some feature to the filtration material depending on any particular application. For example, in the case of a respiratory mask, to which the present invention is particularly directed, such a component 10 may comprise an exhalation valve, a harness, eye shield, headband, or the like, or a portion of any of such component that is to be secured to a filtration material 12 that is suitable for use in making a respiratory mask. Other filtration materials 12 are contemplated for any number of other applications to be combined with other components 10 that may be suitable for such other applications, some of which other applications are described below. The present invention is directed to the methods of attaching such a component 10 to a filtration material 12 and the resultant combination of the filtration material 12 with the component 10.

Figure 1:
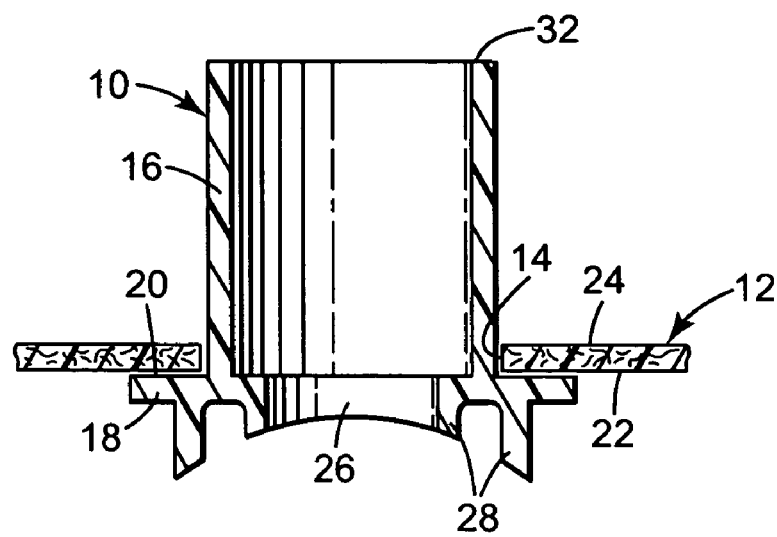
FIG. 1 is a cross-sectional view taken through a component that is in the process of being attached to filtration material by a method of attaching the component in accordance with the present invention.
Figure 2:
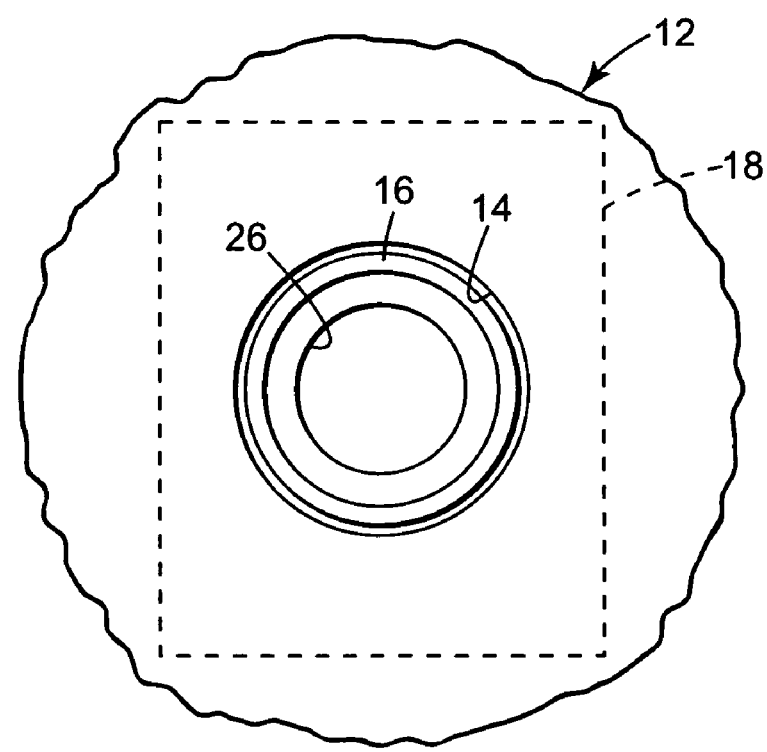
FIG. 2 is a rear plan view of the component illustrated in FIG. 1 in the process of being attached to the filtration material.

As illustrated in FIG. 1, the component 10 is positioned to pass through an opening 14 provided through the filtration material 12. The shape of the opening 14, as shown in FIG. 2, is circular, but it is understood that the shape of the opening 14 can be any shape. Preferably, the opening 14 is shaped to correspond with the shape of a deformable extension member 16 of the component 10, particularly where the extension member 16 passes directly through the opening 14 of the filtration material 12. As also shown in FIG. 1, the opening 14 may be sized just slightly larger than the dimension of the extension member 16 of component 10.

The component 10 also preferably includes a base portion 18 that at least partially surrounds, and preferably completely surrounds, the opening 14 of the filtration material 12 when the extension member 16 of the component 10 is positioned within the opening 14. Base portion 18 thus provides a surface portion 20 for lying against a portion of a first major surface 22 of the filtration material 12 just adjacent to its opening 14. A second major surface 24 of the filtration material 12 also includes a portion thereof that surrounds opening 14 which will be used for contacting at least a portion of the extension member 16 of component 10 when it is modified in accordance with the attachment process described below. Component 10, as illustrated, also comprises a central opening 26 and surface features 28 that are provided extending from the base portion 18 and away from the deformable extension member 16 for the purpose of facilitating a mounting of an additional component thereto. That is, the surface features 28 are provided, for example, as portions of a connection system that cooperate with other portions of the connection system provided on a further component. The opening 26 is provided, in the illustrated case, for the purpose of permitting the controlled passage of fluid through the component 10 as part of the functional feature that is desired to be added to the filtration material 12 by the component 10. The opening 26 and surface features 28 are entirely dependent on the particular application and functional feature of the component 10 based on any particular application. Neither need be provided if not desired for any particular application. That is, the present invention is characterized in that any component 10 including a deformable extension member 16 and a base portion 18 can be attached to any shaped article or length of filtration material 12 having an opening 14.

As illustrated in FIG. 2, the extension member 16 passes through opening 14 of the filtration material 12 so as to extend from the second major surface 24 of the filtration material 12. Base portion 18, and in particular its surface portion 20 lies against the first major surface 22 of filtration material 12. The shape of the base portion 18 is illustrated in a preferable shape of a rectangle that is provided about the central opening 26 of component 10. As with the shape of opening 14 and/or the shape of extension member 16, the base portion 18 can be shaped in any desired shape taking into account the particular application. It is preferable that the base portion 18 be sized and shaped to facilitate a good mechanical connection of the component 10 to the filtration material 12 in accordance with the attachment method described below. As noted above, the base portion 18 need not extend completely about the extension member 16, but preferably extends about the extension member 16 sufficiently to aid in the attachment method described below. For example, the base portion 18 may instead comprise one or more tabs that are arranged radially and that extend from the extension member 16.

Figure 3:
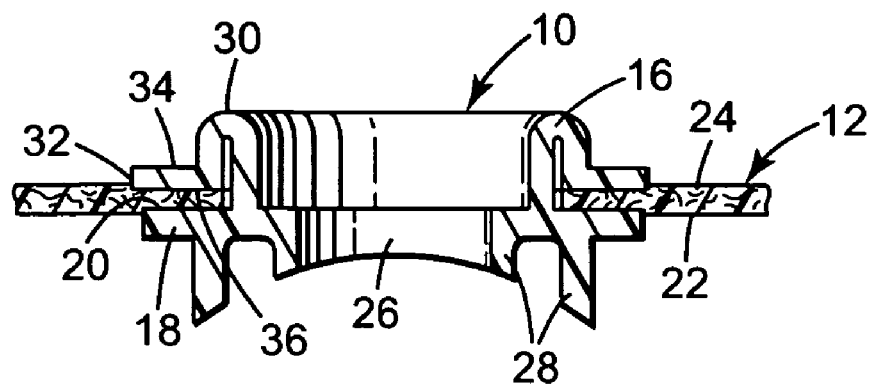
FIG. 3 is a cross-sectional view similar to FIG. 1 but showing in the component as it is attached to the filtration material by a method in accordance with the present invention.

In accordance with a present invention, the extension member 16 is modified from its state illustrated in FIG. 1 to a state where it mechanically clamps with base portion 18 the component 10 to the filtration material 12. One such modification is illustrated in FIG. 3 where a reverse bend 30 is defined within the extension member 16 by bending a tip 32 of the extension member 16 back toward the base portion 18 (in the axial direction of the opening 26 provided through component 10) and a radial extending portion 34 is defined within the extension member 16 by further radially bending the tip 32. By this configuration, an attachment surface 36 is provided by a portion of the outside surface of the extension member 16 of component 10. A portion of the filtration material 12 immediately surrounding opening 14 on both the first and second major surfaces 22 and 24 of filtration material 12 is thus sandwiched between the attachment surface 36 of extension member 16 and surface portion 20 of base portion 18. The effect is an effective mechanical clamping of the component 10 to the filtration material 12 as provided within the opening 14 of the filtration material 12. Preferably, a "fluid tight" connection is provided between the component 10 and the filtration material 12, meaning that there preferably is no path between the filtration material and any surface of the component 10 that permits a significant quantity of unfiltered fluid to pass from one major surface of the filtration material to the other major surface of the filtration material. A significant quantity of fluid is one that detracts from the intended function of the filtration material in removing a constituent of the filtered fluid from the fluid to be filtered.

In order to enhance a fluid tight seal, it is preferable that the filtration material 12 that is sandwiched between surfaces 20 and 36 of component 10 actually be compressed or crushed at least somewhat during the process of the forming or bending the extension member 16 of component 10. This compressing or crushing helps create a better fluid tight seal in that the component surfaces 20 and 36 are more intimately in contact with the filtration material 12. If the filtration material 12 includes or is part of a web having additional layers, the layers are also maintained in better sealing relationship with one another. Moreover, sealants or adhesives may be provided between one or both of the interfaces between the first major surface 22 of filtration material 12 and surface portion 20 of base 18 and between the second major surface 24 of filtration material 12 and surface 36 of extension member 16. Adhesive or sealant may also be applied between layers, if provided. Any conventional known or developed sealant or adhesive that is compatible with the material of the component 10 and filtration material 12 is contemplated.

It is also contemplated to secure the component 10 to the filtration material 12 so as to prevent rotation of the component 10 relative to the filtration material 12. One way of doing this is to simply shape both the deformable extension member 16 of component 10 and the opening 14 of the filtration material 12 as noncircular shapes. Otherwise, a gripping feature (not shown) may be provided extending from either or both of the attachment surface 36 and surface portion 20 of component 10 for extending into the thickness of the filtration material 12 for gripping and preventing such relative rotational movement. A gripping feature can comprise, for example, one or more spikes or ribs extending from one or both surfaces 36 and 20. Alternatively, an amount of adhesive can be provided at either or both interface between the filtration material 12 and surfaces 36 and 20 of component 10 to prevent this relative rotation. Of course, adhesive and gripping features can be used in combination as well.

Figure 4:
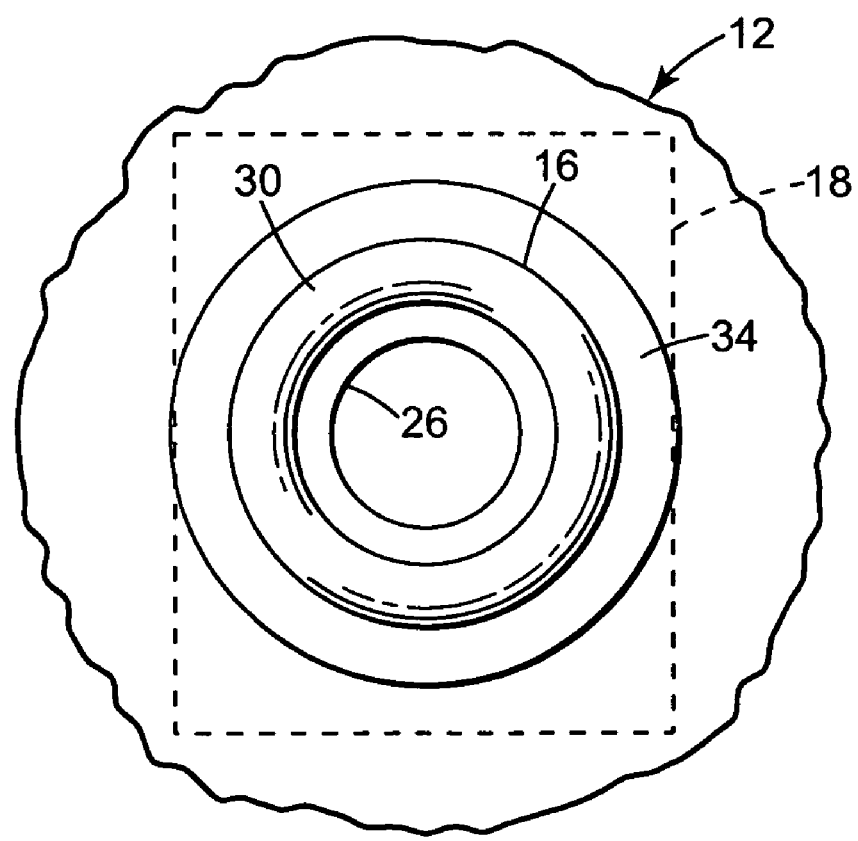
FIG. 4 is a rear plan view similar to FIG. 2 to showing the component as attached to the filtration material by a method in accordance with present invention.

In FIG. 4, the component 10 is illustrated after it has been effectively connected with the filtration material 12. That is, the reverse bend portion 30 formed from the extension member 16 is seen as being annular and concentric with the central opening 26 of the component 10. It is preferred that the bend portion 30 be annular since this facilitates its formation by the forming process described below with minimal difficulties. However, other shapes are contemplated as noted above, which other shapes may require other compensation steps or features to permit the reverse bend to be made. For example, with a rectangular extension member 16 (as viewed in top plan view), it may be necessary to provide slits at the corners thereof so as to permit each side wall to be reverse bent upon itself. Additionally, the radial extending portion 34 made from the extension member 16 is also illustrated as an annular surface in FIG. 4. The shape of this radial portion 34 is also based upon the shape of the extension member 16 in that it is formed from it. Other shapes of the extension member 16 would otherwise dictate the shape of the radial extending portion 34.

One specific method that can be used for deforming the extension member 16 of a component 10 so as to provide an effective connection of the component 10 to the filtration material 12 in accordance with the present invention is schematically illustrated in sequence in FIGS. 5A through 5E. In general, such a deforming process that is capable of bending such extension member 16 back upon itself may be considered a cold forming process or a heat forming process depending on the material of the object 10, and in particular the material of the extension member thereof and the degree of deformation that is required. A cold forming process is considered to be any process whereby the deformation can take place without having to introduce heat to the extension member 16 during the deformation steps. A heat forming process is one where heat is introduced to facilitate the ability to deform the extension member 16. A heat forming process may be required where the object 10 and its extension member 16 comprise a thermoplastic material (such as a relatively stiff polymeric material like polystyrene or a styrene-butadiene copolymer) that otherwise might break during a deforming process. A cold forming process may be conducted where the material of the object 10 is a sufficiently deformable material (such as a relatively softer polymeric material like polypropylene) that is capable of plastically yielding but not breaking during a controlled (but not heated) forming process. The following description of the method illustrated in FIGS. 5A through 5E preferably relates to a cold forming process so that the extension member 16 of the object 10 can be bent back upon itself to provide an annular bend portion 30 and a radial extending portion 34. A heat forming process would be similar but would include the introduction of heat of sufficient magnitude and at least at the yielding locations to permit deformation or reforming of the extension member 16 to form the bend portion 30 and radial extending portion 34.

Figure 5A:
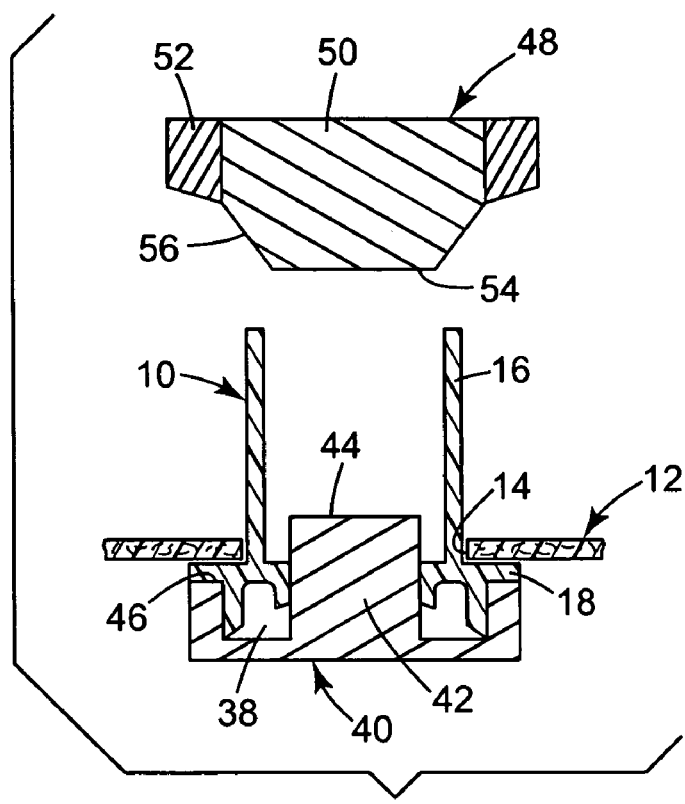
FIGS. 5A through 5E are schematic illustrations in sequence of a component in the process of being attached to filtration material by one method in accordance with the present invention, and in particular.

Starting with FIG. 5A, an object 10 is positioned within a receiving portion 38 of a die 40. Die 40 also includes a central portion 42 that fits within the central opening 26 of the object 10 and defines a stop surface 44 at its distal end. If the object 10 is not provided with a central opening, the die 40 need not include such a central portion 42 and a stop surface could otherwise be provided. Die 40 also provides an anvil surface 46 upon which the base portion 18 can rest. Anvil surface 46 is preferably annular for the purpose of supporting an annular base portion 18; however, it need not be coextensive with the base portion 18. That is, it may extend radially by a greater or lesser amount than the extension of the base portion 18 and it need not extend all the way around die 40. With the object 10 supported by the die 40, extension member 16 of object 10 is inserted through the opening 14 of the filtration material 12. A punch assembly 48 is positioned in axial alignment with the die 40 and is operatively connected with a reciprocal drive device or system (not shown) for moving the punch assembly 48 in its axial direction. Any known or developed reciprocal drive device or system is contemplated. Moreover, it is contemplated that both of the punch assembly 48 and the die 40 be driven, as conventionally known, or that the die 40 be reciprocally driven relative to a fixed punch assembly 48. Furthermore, the punch assembly 48 and/or the die 40 may be driven to move linearly or otherwise so long as the relative movement and a deformation process, such as described and/or suggested below, can be completed. The punch assembly 48 preferably comprises a first inner punch 50 and a second outer punch 52 that are independently movable relative to one another for the purposes described below. In this case, the inner punch 50 and outer punch 52 are preferably independently connected with suitable drive devices or systems to provide the requisite movement. Preferably, the outer punch 52 can be driven with the inner punch 50, but can be further actuated to extend farther even after the inner punch 50 is stopped. In this regard, inner punch 50 can include a stop surface 54.

Figure 5B:
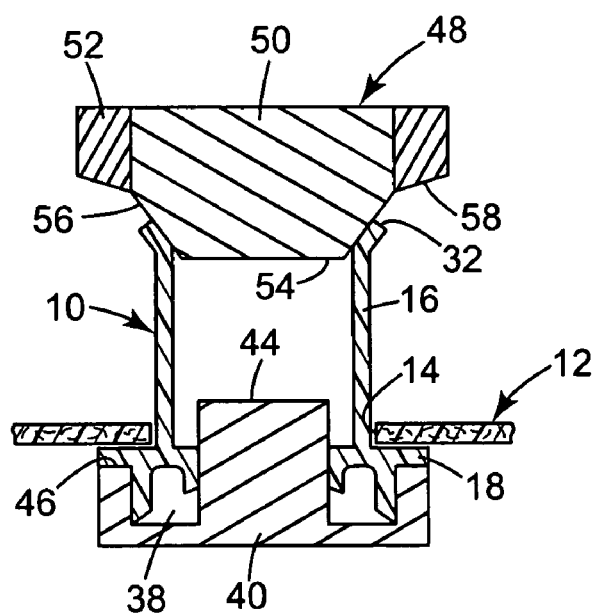
Figure 5C:
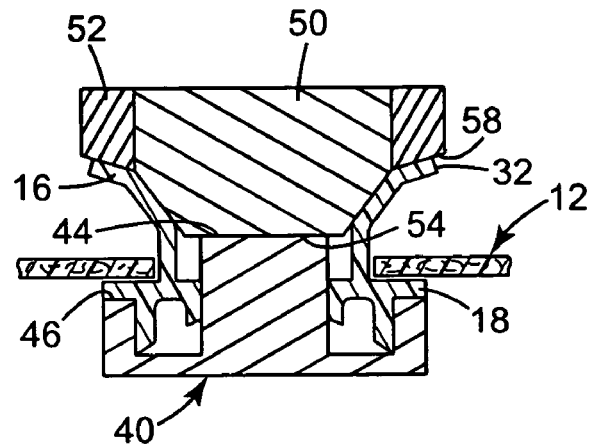

In FIG. 5B, the punch assembly 48 is illustrated at an advanced position with forming surface 56 of the inner punch 50 in contact with the interior of the extension member 16 of object 10. More specifically, the forming surface 56 of punch 50 comprises a tapered surface extending annularly about the punch 50 so as to contact the inside of the circular tip 32 of extension member 16 when the first punch 50 is advanced. Advancing inner punch 50 after initial contact causes a deformation of the extension member 16 substantially in accordance with the slope of the forming surface 56. The first inner punch 50 advances until its stop surface 54 contacts the stop surface 44 of die 40, as shown in FIG. 5C. During this advancement, the extension member 16 of object 10 is continually deformed under the guidance of forming surface 56 and a tapered forming surface 58 provided at the end of outer punch 52. As noted above, movement of inner punch 50 preferably also moves the outer punch 52 the same distance.

Figure 5D:
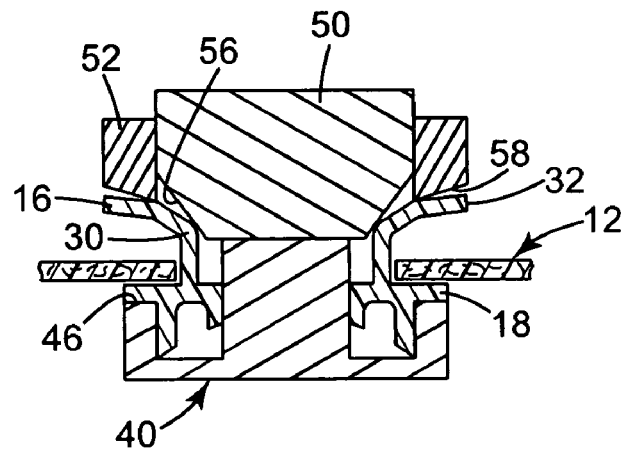
Figure 5E:
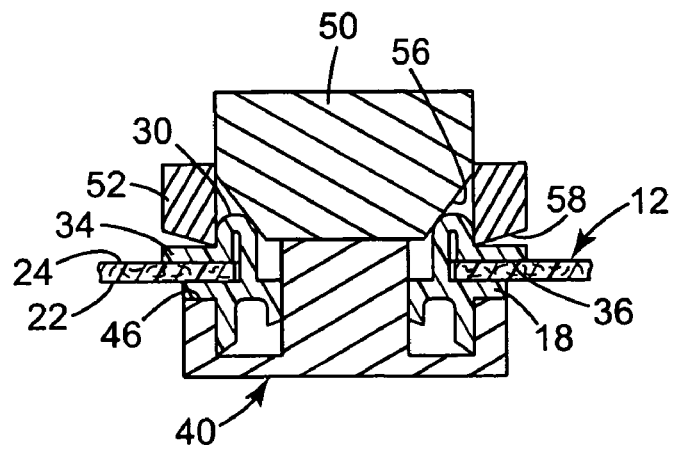

Once the inner punch 50 is stopped against the die 40, the outer punch 52 can be actuated so as to cause relative movement of the outer punch 52 to the inner punch 50. The continued advancement of the outer punch 52 causes a further deformation of the extension member 16 of object 10 as illustrated in FIG. 5D. At this point, the tip 32 of extension member 16 begins to bend back toward the base portion 18 of the object 10. Moreover, the bend portion 30 formed in the extension member 16 begins to be clearly defined where the extension member 16 abuts the forming surface 56 of the first punch 50. Further advancement of the outer punch 52 causes the extension member 16 to completely fold back on itself with the bend portion 30 clearly defined. Then, an end portion of the extension member 16, a portion of the filtration material 12 surrounding its opening 14, and the base portion 18 are preferably pinched between the inner tip of the tapered surface 58 of the outer punch 52 and the anvil surface 46 of the die 40. Thus, the bend portion 30 is completely defined and the radial extending portion 34 is completed. The attachment surface 36 of the radial extending portion 34 of the extension member 16 is positioned against the second major surface 24 of the filtration material 12 with its first major surface 22 against surface 20 of base portion 18. As noted above, preferably, the force provided by the second outer punch 52 is sufficient to at least partially compress the filtration material 12 that is positioned between the radial extending portion 34 and the base portion 18. Once the bend portion 30 and radial extending portion 34 are fully defined, the inner and outer punches 50 and 52 can be retracted so that the deformed component 10 can be removed from its position supported by die 40. That is to say, the deformed component 10 is now effectively connected to the filtration material 12. The same sequence of operations can be performed on a next component 10 to be connected to another filtration material 12, or the same filtration material 12 depending on the specific process and particular application.

In the absence of central opening 26 through component 10, die 40 would not include a central portion 42 that extends through the component 10. Moreover, stop surface 44 would not be provided. Component 10 would still include an extension member 16 in accordance with the present invention which could be deformed in the same manner described his above. The extension member 16 could be tubular, which shape in plan view could be any shape, such as circular, rectangular, etc. Movement of the inner punch 50 could be limited by any other conventional means, such as by simply controlling the extent of its advancement by controlling its drive device or system (not shown). The deformation process could otherwise be the same.

In the case where the central opening 26 through a component 10 includes other structural components, such as cross braces or other elements, the die 40 may still include its central portion 42 for extending through the component 10 and for providing a stop surface 44. However, it may be necessary to provide one or more relief areas (i.e. grooves or cut away portions) so that the center portion 42 can pass sufficiently within and through one or more portions of the central opening 26 of the component 10. Or, even with a center portion 42 having such relief areas, movement of the punch and die can be otherwise limited, such as is noted above.

In order to drive the inner and outer punches 50 and 52, respectively, any suitable drive mechanism that is known or developed can be utilized. Each punch can be independently driven and preferably synchronized or a common drive mechanism could move them together and permit the farther extension of the outer punch 52. For example, a common drive device could include a single actuator that may be pneumatically, hydraulically, electrically or mechanically driven that is operatively connected with the punch assembly 48. In particular, such an actuator can be connected with the outer punch 52 so as to move it over its full range of movement, and the inner punch 50 can be operatively connected with the outer punch 52 by way of a slip or play permitting means. A spring (not shown) could be provided between the inner punch 50 and the outer punch 52 that is stiff enough so that movement of the outer punch 52 translates into direct movement of the inner punch 50 until the inner punch 50 is stopped. Thus, when the stop surface 54 of the inner punch 50 contacts the stop surface 44 of die 40, its movement is stopped. But, the outer punch 52 can continue to advance under the drive of its attached actuator with its relative movement with respect to the inner punch 50 taken up by the spring or any other slip or play means.

It is also contemplated that the deforming operation schematically illustrated in FIGS. 5A–5E could be conducted by a single punch. That is, a single punch can be provided with a forming surface that itself can define the desired shape of the extension portion after full advancement thereof. As in the above described example, a punch could be advanced so that when the material of the extension portion 16 yields sufficiently, it will fold over on itself. Further advancement can then also define the radial extending portion 34.

Figure 6:
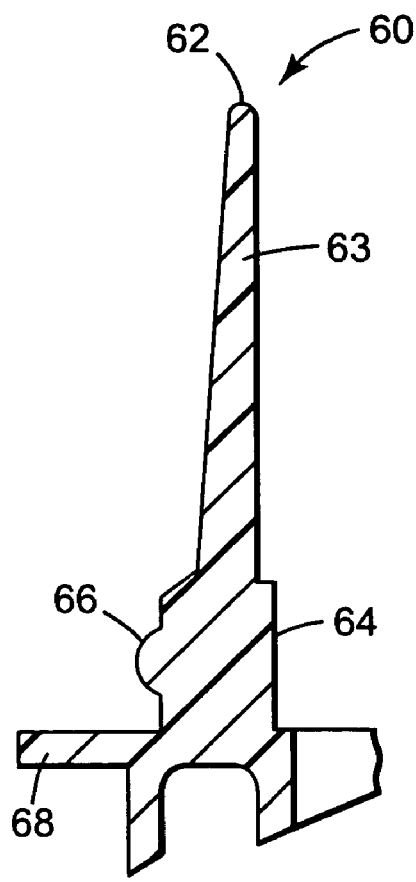
FIG. 6 is an enlarged partial cross-sectional view of the extension member of the component of FIGS. 1–5 illustrating a modified formation thereof, where in the extension is tapered from the component side to its tip and having a protrusion to facilitate its attachment to a layer of filtration material.
Figure 7:
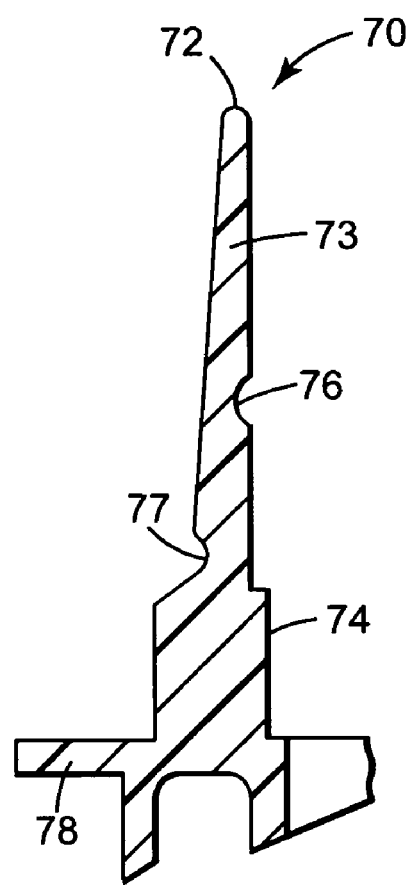
FIG. 7 is an enlarged partial cross sectional view similar to FIG. 6, wherein the extension is tapered from the component side to its tip and includes grooves defined for providing weakened zones that will define bends that will be formed during the attachment process.

Alternative configurations for the extension member 16 of FIGS. 1–5 are illustrated in FIGS. 6 and 7. Shown are partial cross-sectional views that illustrate the cross-section through the wall defining the extension member of the component and a portion of its base portion. In particular, in FIG. 6, an extension member 60 is illustrated having an outer tip 62 and an inner pedestal 64. A protrusion 66 is also preferably provided extending radially outwardly from the pedestal 64 and partially above base portion 68. Between the outer tip 62 and the pedestal 64, a deformable section 63 of the extension member 60 is defined, which is preferably tapered at its external surface from the pedestal 64 to the outer tip 62. By making the deformable section 63 tapered toward the outer tip 62, the extension member 60 is increasingly more easily deformable toward the outer tip 62. Additionally, the tapered deformable section 63 advantageously facilitates the ability to form the component by a molding process, such as injection molding. This configuration facilitates the bending back of the extension member 60, such as in the manner described above, for securing the component to filtration material. The pedestal 64 provides a substantially rigid section of the extension member 60 so as to provide an undeformed upstanding part of the component after deformation is complete. The protrusion 66 is preferably provided to help hold the filtration material in place relative to the base portion 68 after the deformation step is performed. Also the protrusion 66 enhances the making of a fluid tight seal between an inner edge of the filtration material that defines the opening 14 through the filtration material and the component that is attached thereto. As above, preferably the extension member 60 and thus its deformable portion 63, pedestal 64 and protrusion 66 are generally circular in a transverse cross-section of the extension member 60.

In FIG. 7, an extension member 70 is illustrated having an outer tip a 72, a deformable portion 73 and pedestal 74. Like the FIG. 6 embodiment, the deformable portion 73 is preferably tapered along its outer surface from the pedestal 74 toward the tip 72 to facilitate insertion thereof into an opening of filtration material, manufacturing thereof, and deformation thereof toward base portion 78. At a point partially spaced inward from the outer tip 72 and along the inside wall of the deformable portion 73, a groove 76 can be provided that further facilitates the bending of the extension member 70 into the attachment process, such as described above. A second groove 77 may also be provided on the outer wall of the deformable portion 73 adjacent to where it connects with the pedestal 74 to also facilitate the bending of the extension member 70. That is, the thinned areas created by the grooves 76 and 77 will yield more easily than the areas just adjacent thereto so as to define the points where the extension member 70 will bend during the attachment process. With regard to the initial example described above, the groove 77 will facilitate the definition of the bend portion 30 and the groove 76 will facilitate creation of radial extending portion 34 by defining the bend line that is formed adjacent to it. The pedestal 74 will create an undeformed upstanding part of the component after deformation is complete. Again, the extension member 70 and thus its deformable portion 73, pedestal 74 and grooves 76 and 77 preferably extend in a generally circular fashion as viewed in transverse cross-section. It is further noted that the modifications illustrated in FIG. 6 and 7 may be used together with one another selectively or in combination.

Figure 8:
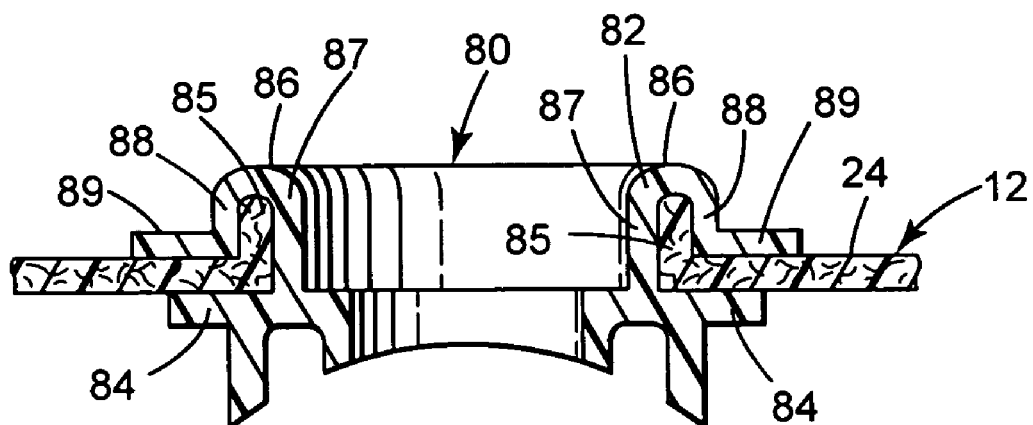
FIG. 8 is similar to FIG. 3 but shows an alternative configuration of a manner of attaching the filtration material to a component.
Figure 9:
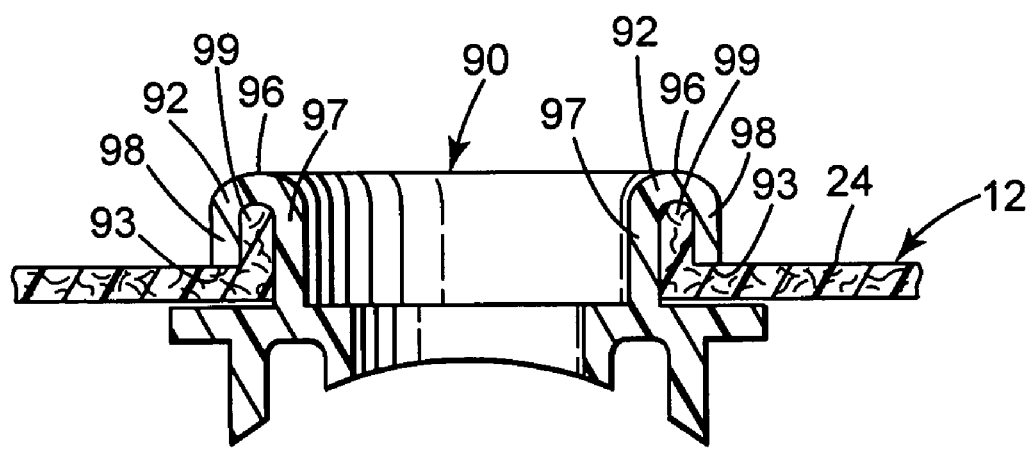
FIG. 9 is also similar to FIG. 3 but shows yet another alternative configuration of a manner attaching the filtration material to component.

Alternative attached configurations between a component and filtration material are illustrated in FIGS. 8 and 9. In FIG. 8, a component 80 is illustrated connected to a filtration material 12. An extension member 82 is provided through an opening of the filtration material 12, but the opening through the filtration material 12 is sized smaller than the outer diameter of the extension member 82. That is, a peripheral portion of the filtration material 12 just adjacent its opening is turned up along the outer wall of the extension member 82, such as when the object 80 is inserted through the opening of the filtration material 12. This turning up of filtration material may be facilitated by the inherent flexibility of the filtration material 12 or may require reliefs or cuts from the opening edge. In any case, when the extension member 82 is bent back toward the base portion 84 of component 80 to make a bend portion 86, a peripheral portion 85 of the filtration material 12 is sandwiched between vertical portions 87 and 88 of the extension member 82 in addition to it being provided between a radial extending portion 89 and the base 84. As above, it is preferable that the filtration material 12 including its peripheral portion 85 be at least somewhat compressed to provide an airtight attachment configuration, even where multiple layers are involved. This alternative configuration can be produced in accordance with the same method described above with reference to FIGS. 5A through 5E, but with the additional step of turning the peripheral portion 85 of the filtration material 12 vertically along a bit of the outer wall of the extension member 82 prior to the deformation operation.

As will be well understood to one of ordinary skill in the art, the punch and die configuration can be modified as to their spacing relative to one another and the extent of relative movement with respect one another so as to accomplish any number of similar modifications. For example, the inner tip edge of the outer punch 52, described above, can be provided more closely to the point where the extension member of the component first hits the forming surface 56 of the inner punch 50 so that when the outer punch 52 is fully advanced, the vertical portions on either side of the defined bend are provided closer to one another. This may be used to create a greater compression or crush of the filtration material peripheral portion 85 therebetween. As above, formation of the bend 86, vertical portion 88 and radial extending portion 89 may be performed by cold forming the extension member 82 if its material is sufficiently malleable (i.e. having the ability to be plastically deformed without breaking) at normal temperatures, or may be thermally formed with the addition of heat.

In FIG. 9, a component 90 having an extension member 92 is inserted within an opening of filtration material 12 in a similar manner as that described above with reference to FIG. 8. As a result, a portion 99 of the filtration material 12 is sandwiched between vertical portions 97 and 98 that are separated by bend 96. This configuration is, however, different in that no radial extending portion is created. Instead, an end surface of the tip 93 of the extension member 92 is directed against the second major surface 24 of filtration material 12 to effectively hold the component 90 to the filtration material 12. Again, such a configuration can be created accordance with the method discussed above with reference to FIGS. 5A through 5E. In this case, the initial length of the extension member 92 is chosen so that upon the creation of the bend 96, the tip 93 will be directed into the filtration material 12 by the further movement of the outer punch 52 in the manner described above.

It is understood that the modifications disclosed in FIGS. 8 and 9 may be used in any number of ways and modifications. For example, a configuration similar to FIG. 9 can be created without the portion 99 of filtration material provided between vertical portions 97 and 98. Other configurations are also contemplated wherein at least some portion of the extension member of any component be in contact with a second major surface of the filtration material while a base portion of such component is at least partially in contact with a first major surface of the filtration material.

As noted above, the component 10 can be any component that is to be attached to a fluid filtration material 12. Moreover, the component 10 can be formed from any suitable material(s) provided that the extension member thereof is capable of being deformed, as described above, which deformation can be conducted as a cold process or a heat forming process. Preferred materials include yieldable thermoplastic polymers, such as, for example, polypropylene, polyethylene, or polyester. These polymers are preferred in that they can be deformed by a cold forming process. Other more brittle thermoplastic polymers including polystyrene and copolymers such as styrene-butadiene are also usable, but they would likely require the addition of heat as part of a thermal forming process.

In the context of respiratory masks, as discussed in the Background section of this application, the component 10 can be the base of a respirator exhalation valve or an attachment member for a respirator harness or eye shield. In the making of the respiratory masks, the filtration material 12 typically provides the body of the respirator (whether flexible and foldable or pre-formed) and the component adds a feature to the basic mask structure. The same is often true for many other types of filters; for example, vacuum cleaner bags that include a fluid inlet/outlet that is attached to the filter bag for connection with a vacuum cleaner. With this in mind, various possible forms for the component 10 and filtration material 12 are described below so as to illustrate a wide range of situations in which the attachment methods described and suggested above can be employed.

Figure 10:
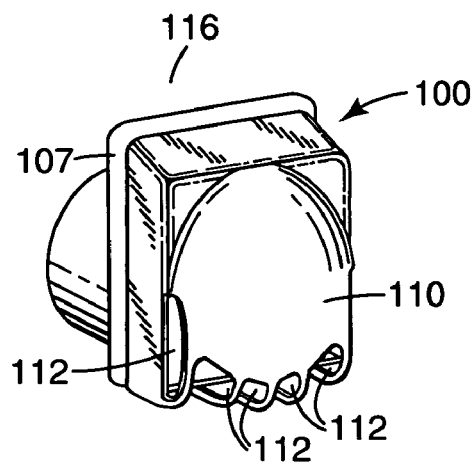
FIG. 10 is a perspective view of an exhalation valve that is suitable for connection to a respiratory mask in accordance with the present invention.
Figure 11:
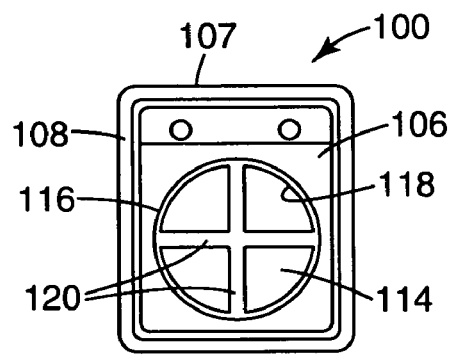
FIG. 11 is a rear view of the exhalation valve of FIG. 10.
Figure 12:
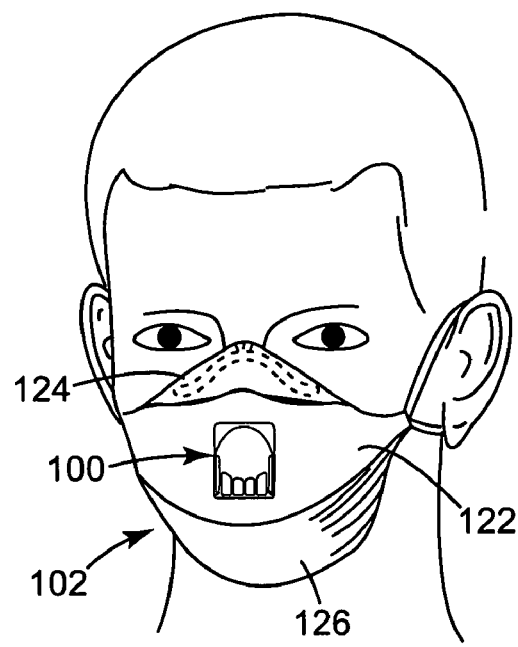
FIG. 12 illustrates the exhalation valve of FIGS. 10 and 11 attached to a respiratory mask and positioned on the face of the user.
Figure 23:
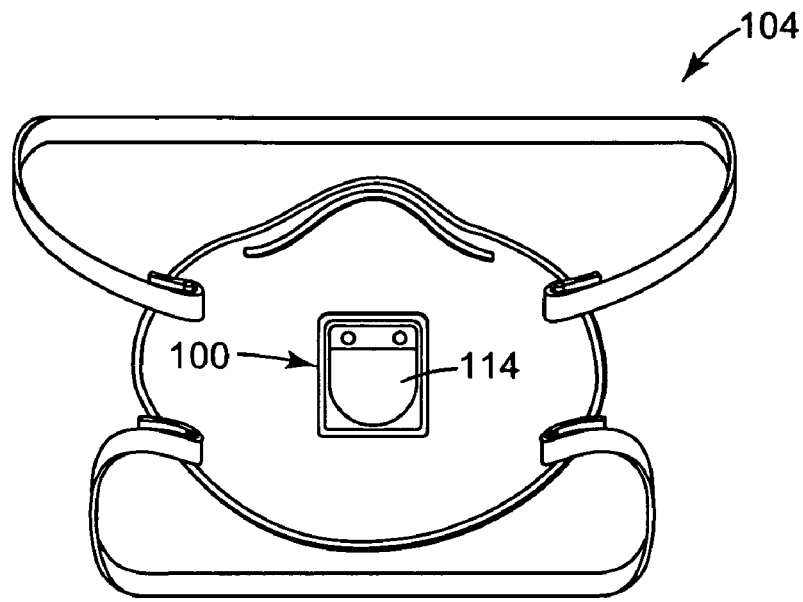
FIG. 23 is a front view of a molded-type respiratory mask combined with a component, namely an exhalation valve, wherein the component can be attached to the molded respiratory mask by a method in accordance with the present invention.

In FIGS. 10 and 11, an exhalation valve 100 is illustrated that may be secured in the manner of the present invention to a respiratory mask, for example, such as a foldable and flexible respiratory mask 102 illustrated in FIG. 12 or a pre-formed respiratory mask 104 illustrated in FIG. 23. The valve shown in FIGS. 10 and 11 comprises a valve body 106 that includes a base portion 107 that preferably extends entirely around the periphery of the exhalation valve 100. The base portion 107 functions similar to the base portion 18, described above, and includes a surface 108 for lying against an outer surface of the respiratory mask 102. A valve cover 110 can be permanently or removably attached to the valve body 106 and provides openings 112 through which air can pass. Permanent attachment can be accomplished, for example, by applying adhesive or by a welding technique, such as ultrasonic welding. Removable attachment can be made, for example, by using resilient clips. The valve body 106 can include an attached flap-type valve 114 (shown in FIG. 23) that lies against a seat surface (not shown) that surrounds a valve opening 118 so that the flap valve functions as a one-way valve that opens the opening 118 during exhalation. Such a valve is known and commercially available and is described in U.S. Pat. No. 5,325,892. The valve body 106 and valve cover 110 are preferably thermoplastic molded components, typically formed from a polypropylene material.

The valve body 106, in accordance with the present invention, also includes an extension member 116 extending from the valve body 106 and away from its surface 108 that will lie against the respiratory mask 102. The manner by which the extension member 116 is structurally connected with the valve body 106 is not critical, but it is preferred that the extension member 116 be integrally formed with the valve body 106 for structural strength. Moreover, it is preferable that the extension member 116 also be positioned about the central opening 118 (i.e. that it preferably be circular, tubular and hollow) so that the central opening 118 also defines a fluid flow passage through the exhalation valve 100. As illustrated, structural cross members 120 may also be provided connected across the central opening 118 for structural integrity of the valve body 106 and to keep a flap-type valve 114 from being able to be sucked back into the central opening 118.

As a result of the provision of the surface 108 and the extension member 116, the exhalation valve 100 can thus be secured to a respiratory mask 102 or 104 in the manner described above with reference to FIGS. 5A through 5E. Specifically, the extension member 116 would be inserted through an opening provided in either respiratory mask 102 or 104, after which the extension member 116 could be deformed in any way described or suggested above. Moreover, the exhalation valve 100 may be attached to the respiratory mask 102 or 104 either before or after the mask itself is formed. It is also contemplated that the attachment operation may be performed on a selective basis or as part of an inline manufacturing operation. An inline attachment operation can be performed at any point in the manufacturing line where there is sufficient access to the web in the making of a respiratory mask.

Figure 13:
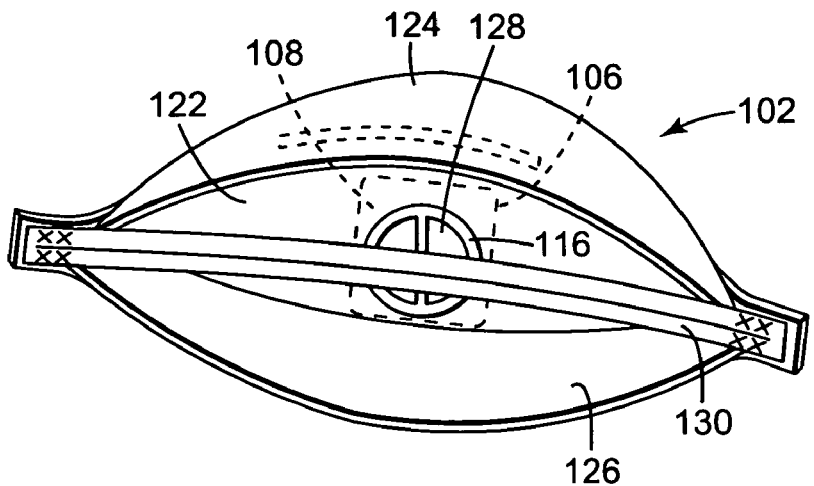
FIG. 13 is a rear view of a respiratory mask including an exhalation valve, the respiratory mask being of the folded type and illustrated in an unfolded state.

A foldable respiratory mask 102 is illustrated in FIGS. 12, 13, 14 and 15. Basically, such a respiratory mask 102 includes filtration material that is defined to have a generally elliptical center panel 122 and upper and lower panels 124 and 126. The exhalation valve 100 is preferably attached through an opening 128 provided in the center panel 122. Again, the valve body 106 includes an extension member 116 that, as can be seen in FIG. 13, is deformed to act with the surface 108 of the valve body 106 to secure the exhalation valve 100 to the center panel 122. The respiratory mask 102 is designed so that when the panels 122, 124 and 126 are reconfigured so that the mask 102 is expanded, a generally cup-shaped chamber is defined to be fit over the nose and mouth of a wearer. A headband 130 is further preferably provided as attached near the opposite longitudinal ends of the center panel 122, and as illustrated, the headband preferably comprises a two-part headband, each part of which comprises a length of elastic material. The headband 130 can be conventionally secured to the filtration material making up the panels, such as center panel 122, by heat sealing or adhesive or the like.

Figure 14:
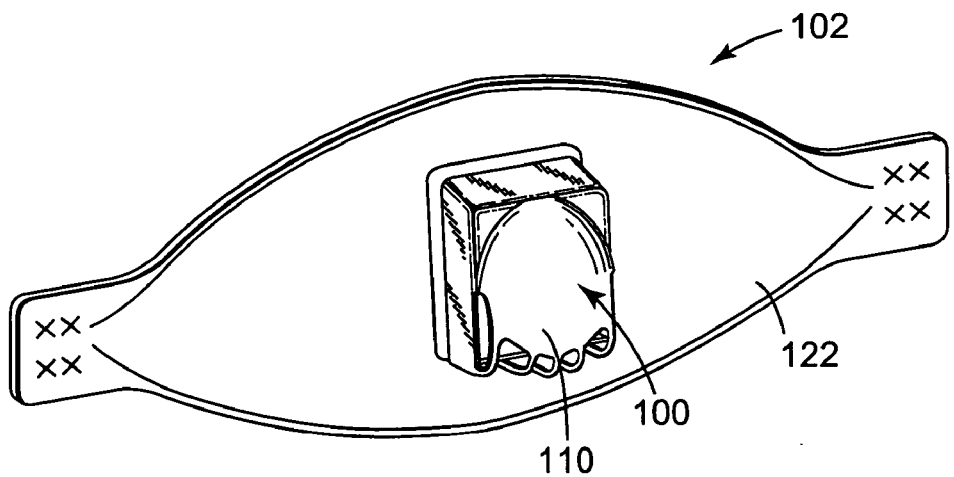
FIG. 14 is a perspective view of the respiratory mask of FIG. 13 from the front side with the respiratory mask in a folded state.
Figure 15:
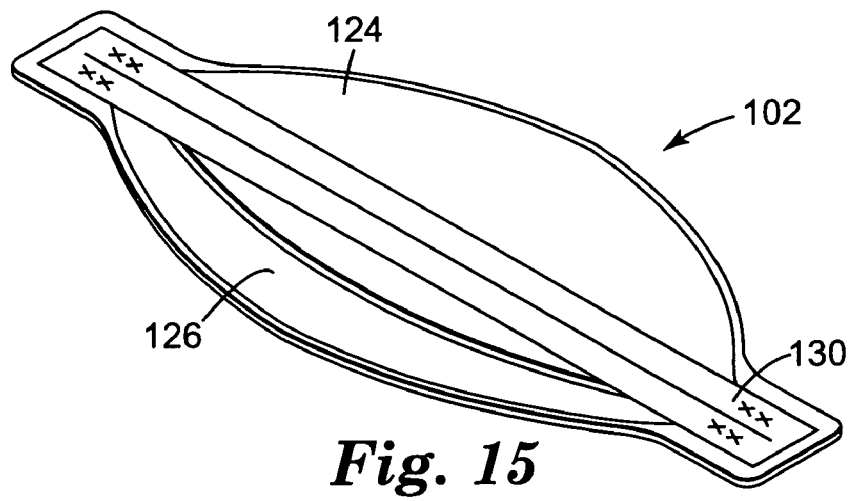
FIG. 15 is a perspective view of the respiratory mask of FIG. 13 from the rear side with the respiratory mask in a folded state.

The advantage of respiratory mask 102 is that it can be folded flat for storage by folding the upper and lower panels 124 and 126 behind the center panel 122. The folded respiratory mask 102 is illustrated in FIGS. 14 and 15. Each of the panels 122, 124 and 126 of the respiratory mask 102 typically comprises at least one layer of filtration material (i.e. a layer of filtration material capable of removing contaminants from air that passes through the filtration material) that is positioned between inner an outer cover webs. The center panel 122 may also advantageously include a layer of reinforcing material, and the upper panel 124 may also include layer of foam material. Respiratory masks that are similar to that shown in FIGS. 12 through 15 are described in international published patent applications numbers WO 96/28217 a and WO 97/32494.

Figure 16:
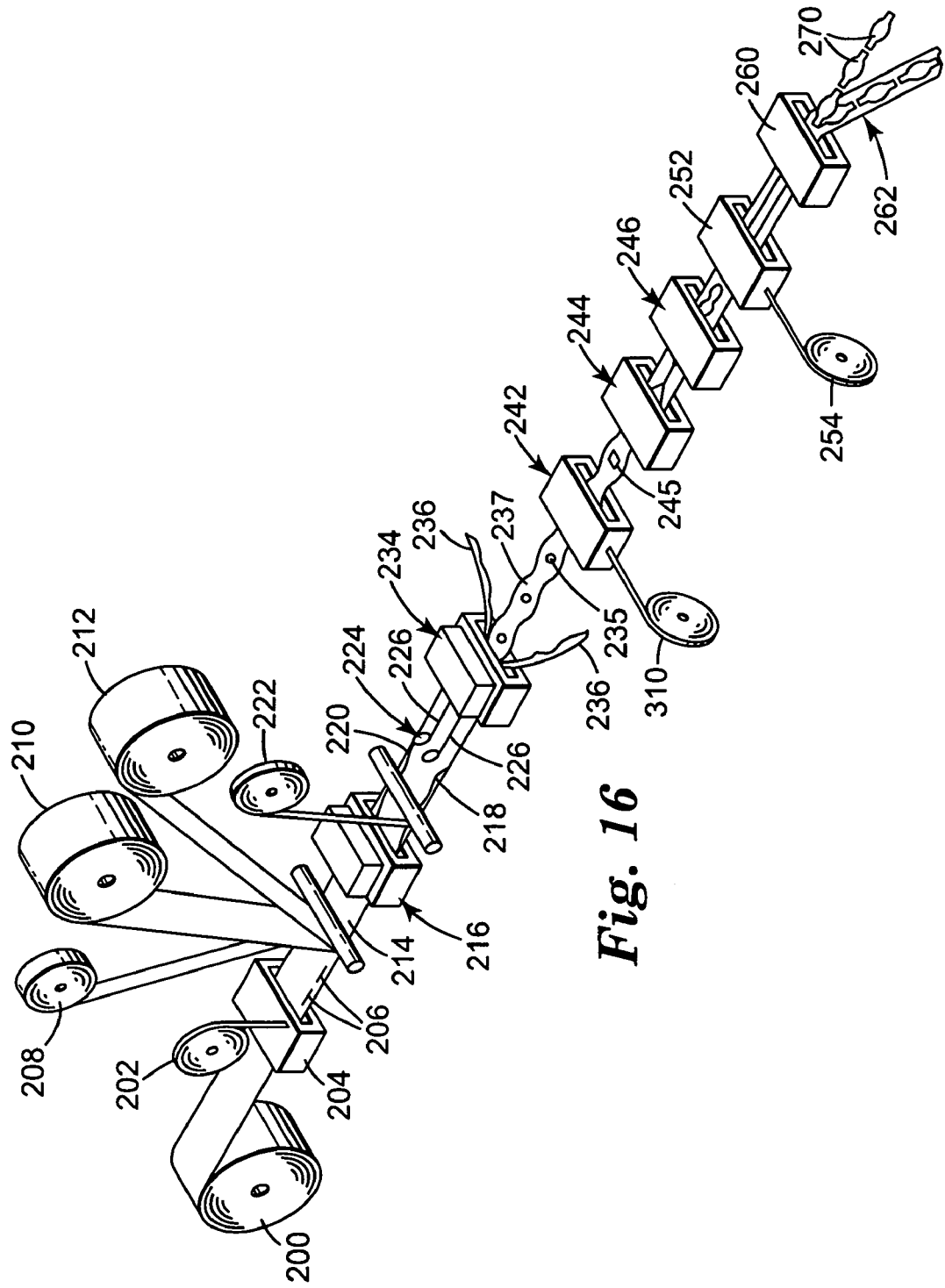
FIG. 16 is a schematic illustration of an inline process for making respiratory masks such as illustrated in FIGS. 12–15 including process steps for attaching a component, namely an exhalation valve, to each of the respiratory masks in line with the production of the respiratory masks from a plurality of layers including a layer of filtration material.

In FIG. 16, a forming process is schematically illustrated for making foldable type respiratory masks. Each manufacturing step is preferably performed in line with one another so as to define a high-speed inline process. In accordance with the present invention, this high-speed inline process can also advantageously include the mounting of a component, such as an exhalation valve, inline with the other process steps and at the same high speed of operation. In accordance with the illustrated method, the mask making process starts with a supply of outer cover web material 200, preferably in the form of a roll of such material. As the outer cover web material 200 travels in the machine direction of the system, it is built upon with a number of other components that are layered together to produce the masks which are eventually cut from the stacked up layered material. A first preferable material added onto the outer cover web 200 is supplied at 202 to a cutting and applying station 204. The material 202 preferably comprises a deformable material such as a metal strip which can be cut into sections 206 in making deformable nose clips provided in the respiratory masks. To do this, discrete sections 206 of the material 202 are applied along the outer cover web 200 at spaced locations and near the web edge, one section 206 for each respiratory mask to be produced. Next, a reinforcement material 208 is preferably supplied in a continuous manner to provide a layer covering a central portion of the cover web 200. On top of the outer cover web 200 with the spaced sections 206 of nose clip material and the reinforcement material 208 thereon, a full width layer of filtration material 210 and subsequently an inner cover web material 212 are provided. At this point, a multi-layer composite web 214 is built-up from which the respiratory masks can be converted. It is noted that the various operations for cutting, applying and layering the various materials upon one another are not important features of the present invention, and any conventional or developed technique or process can be utilized in accordance with the present invention. It is preferable that these operations be performed inline so that a high speed manufacturing process results.

Figure 17:
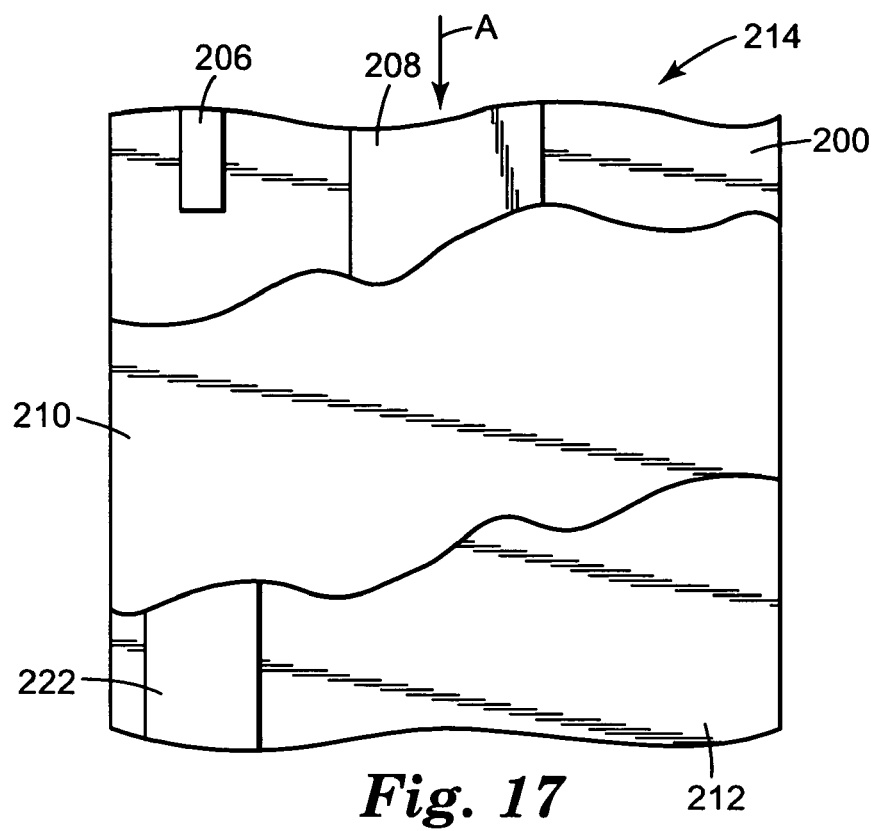
FIG. 17 is a partial top plan view showing the sequential build-up of layers in making a composite web material including a filtration material that is suitable for making respiratory masks of the type that are constructed in accordance with process of FIG. 16.
Figure 18:
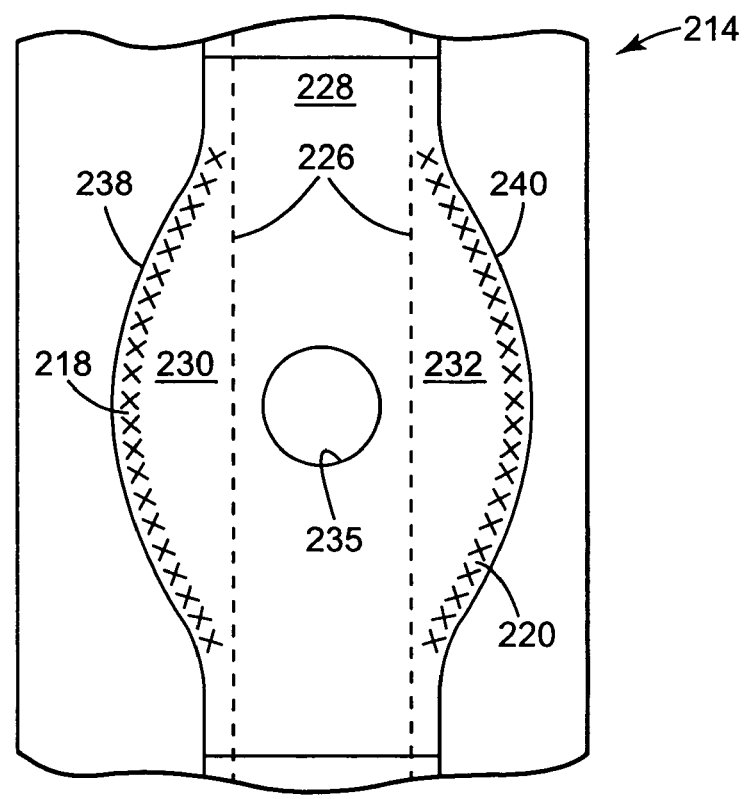
FIG. 18 is a partial top plan view of the materials in making the respiratory masks in accordance with a process of FIG. 16 with the respiratory masks partially formed after formation of fold lines and side edge heat seals.

After the composite web 214 is formed, a welding station 216, preferably a heat sealing operation, provides heat seal lines defining the outside edges 218 and 220 (shown in FIG. 18) that will become the face-fitting edges of the respiratory masks. Next, a foam strip material 222 is preferably provided as a continuous material over the composite web material 214, and in particular, over the sections 206 of deformable nose clip material. In FIG. 17, the sequential layout of the web material 214 and foam strip 222 is illustrated in the machine direction indicated by arrow A from a top view of the composite web material 214. At the leading edge of the illustrated web material (the bottom of FIG. 17) the inner cover material 212 includes the foam layer 222 as a continuous layer covering a portion thereof. In the mid section of the illustration, prior to the application of the inner cover material 212, the filtration material 210 is shown, which covers, as illustrated at the trailing edge, the outer cover layer 200 having the centrally located reinforcement material 208 and section 206 of nose clip material thereon. At this point, is noted that the foam strip 222 and/or sections 206 of nose clip material may alternatively be positioned on the outer surface of either the inner cover web material 212 or the outer cover web 200, or the foam strip 222 could be positioned within the makeup of the composite web material 214. Moreover, any number of layers of filtration material 210 can be provided instead of just one layer as illustrated.

A next conversion step can comprise a scoring station 224 where scoring wheels define spaced parallel fold lines 226 (also shown in FIG. 18), the purpose of which is to divide the sequentially produced respiratory masks into central panels 228 and side panels 230 and 232. After the scoring station 224, a cutting station 234 is provided for trimming side edge refuse strips 236 by cutting the web material just outside the heat seal lines 218 and 220 at cutlines 238 and 240, respectively (see FIG. 18). An opening 235 is also preferably cut through the web material at a point corresponding to a predetermined position for each mask at the cutting station 234. The result at this point is an unlimited number of respiratory mask blanks 237 that each have an opening 235 and that are connected together in series. The next illustrated station preferably comprises a valving station 242, where exhalation valves 245 are sequentially attached to each respiratory mask blank 237 in line with the other manufacturing operations. A manner of attaching the exhalation valves 245 by such a valving station 242 will be described in greater detail below.

Next, the sequentially connected respiratory mask blanks 237 with valves 245 are advanced to a folding station 244 whereby side panels 230 and 232 are folded inward at their respective fold lines 226 to form sequentially connected respiratory mask blanks 237 in their folded state. A top plan view of the mask blanks 237 with side panel 230 folded over first and side panel 232 folded over on top of side panel 230 is shown in FIG. 19 (ignoring for the moment the other features illustrated in FIG. 19 and discussed below).

The folded respiratory mask blanks 270 are then advanced to another welding station 246, which, like station 216, also preferably comprises a heat sealing operation. At welding station 246, the mask blanks 270 are welded while in their folded state along lines 248 and 250. This step welds web material of the folded side portions 230 and 232 with web material of a central panel 228 of the web 214 in arc portions that are spaced from and that generally correspond to the edges 218 and 220 of the side panels 230 and 232, respectively. By this operation, a mask front panel is defined that is shaped as illustrated by the mask of FIG. 14 (i.e. as an elongate oval with side tabs), and the shaped front panel is connected with the side panels 230 and 232 so as to produce a respiratory mask that can be unfolded to a usable cup-shaped state.

Next, each folded respiratory mask 270 (still connected in series) is advanced to a headband attaching station 252 where headband material 254 is applied and attached to each mask 270. Specifically, the headband material 254 is attached to each mask 270 at a series of locations 256 and 258, as also shown in FIG. 19, so that individual headbands are connected to each mask 270. This attachment can be done at each location 256 and 258 by a welding operation, by applying adhesive, or by otherwise providing a mechanical connection. Then, a final cutting station 260 trims the excess material 262 (see FIG. 19) from outside the weld lines 248 and 250 that define the strip of folded respiratory masks 270.

Also at the cutting station 260, the masks 270 are preferably at least partially separated from one another at edges 264 between the locations 256 and 258 where the headband material 254 is attached to the masks 270. As shown in FIG. 16, each mask 270 may be completely separated at edges 264 so that each mask 270 is completely cut out from the excess material 262. Alternatively, the masks 270 may be left partially connected at edges 264 by cutting a line of perforations or otherwise defining a line of weakening between the masks 270 (see FIG. 20). The masks 270 can then be easily separated for use. An advantage of leaving the masks 270 connected together is that they can be packaged in roll form. Also, a portion of the headband material 254 between headband attachment locations 256 and 258 may be removed during the cutting or perforation process, as illustrated in FIG. 20 leaving the edges of the headbands spaced from one another. Alternatively, the headbands may terminate at the edges 264.

Any of various materials may be employed in the process illustrated in FIG. 16, namely, as the filter layer 210; the outer cover web material 200; the inner cover web material 212; the foam material 222; the reinforcement material 208; the nose clip material 202; and the headband material 254. Some specific materials that are suitable for making such respiratory masks are described in WO 96/28217, the entire disclosure of which is incorporated herein by reference. Alternatively, the headband material 254 may be as described in WO 97/32493 or U.S. Pat. No. 5,724,677, the entire disclosures of which are also incorporated herein by reference. However, many other headband configurations and designs and attachment techniques are also possible including, for example, a headband that comprises two separate bands secured to the mask by staples.

Filtration material layers that are commonplace in respiratory masks, like the mask 102 shown in FIGS. 12 to 15, often contain an entangled web of electrically charged melt-blown microfibers (BMF). BMF fibers typically have an average fiber diameter of about 10 micrometers ($\mu$m) or less. When randomly entangled in a web, they have sufficient integrity to be handled as a mat. Examples of fibrous materials that may be used as filters in a mask body are disclosed in U.S. Pat. Nos. 5,706,804; 5,472,481; 5,411,576 and 4,419,993. The fibrous materials may contain additives to enhance filtration performance, such as the additives described in U.S. Pat. Nos. 5,025,052 and 5,099,026 and may also have low levels of extractable hydrocarbons to improve performance. Fibrous webs also may be fabricated to have increased oily mist resistance as shown in U.S. Pat. No. 4,874,399. An electric charge can be imparted to nonwoven BMF fibrous webs using techniques described in, for example, U.S. Pat. Nos. 5,496,507; 4,592,815 and 4,215,682. The outer and inner cover webs of the center and side panels (such as those indicated at 122, 124 and 126 of the mask 102 shown in FIGS. 12–15) protect the filtration material layer from abrasive forces and retain any fibers that may become loosened from the filtration material layer. The cover webs may also have filtering abilities, although typically not nearly as good as those of the filtration material layer. The cover webs may be made from non-woven fibrous materials containing polyolefins and polyesters as described, for example in U.S. Pat. Nos. 4,807,619 and 4,536,440.

Figure 21:
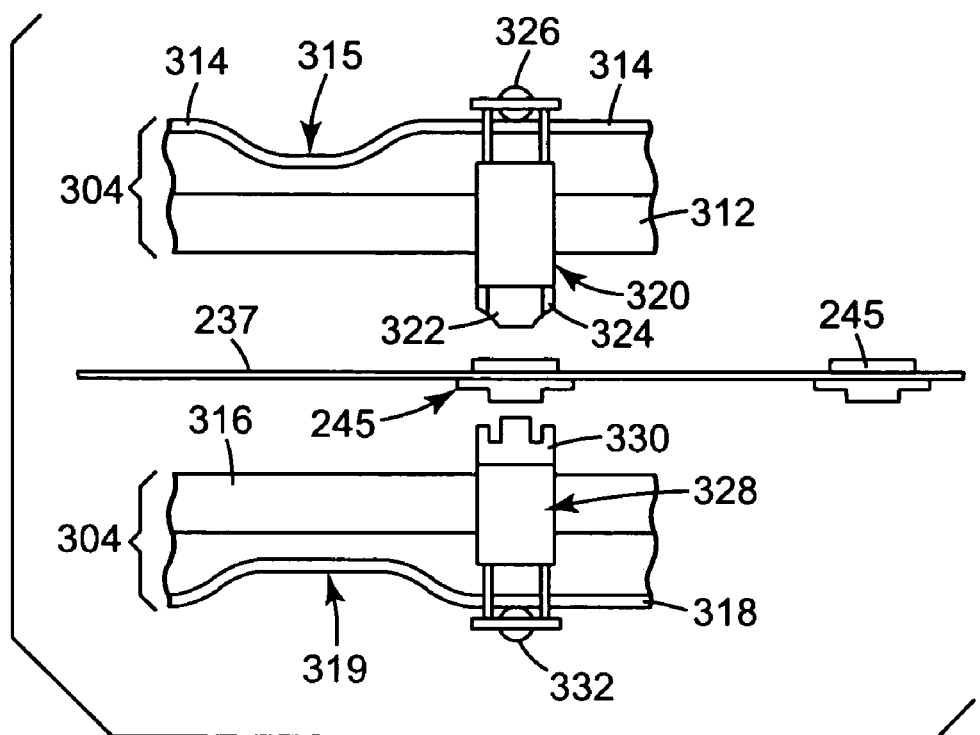
FIG. 21 is a schematic illustration of a portion of the process illustrated in FIG. 16 showing a punch and die arrangement and a manner of control thereof for attaching a component in line with a respiratory mask making process in accordance with the present invention.

A manner by which the valves 245 can be attached through openings 235 to the series of connected respiratory mask blanks 237 will be described as follows with reference to FIGS. 21 and 22. The following description relates to a manner by which a valve 245 can be attached to each respiratory mask while the respiratory masks are moved in a machine direction without stopping. That is, it is preferred that the attachment method comprise an inline operation that does not require stoppage of movement of the respiratory masks in order to perform the valving operation. It is, however, contemplated that the valving operation can instead be conducted while the connected series of respiratory masks are stopped. Moreover, as noted above, the valving operation may be performed on such respiratory masks or any other filtration material that is to be converted to a filtration device on an individual basis or as part of a manufacturing line. A method by which the valves 245 can be attached to the respiratory mask blanks 237 without stopping is preferred in that a high speed attachment operation and manufacturing operation of respiratory masks can be performed.

As the series of connected respiratory mask blanks 237 enter the valving station 242 illustrated in FIG. 16, they have been provided with exhalation valve attachment openings 235 at the cutting station 234. Otherwise, a separate cutting station could be provided within the valving station 242 for cutting the openings 235 in each mask blank 237. Like the valving manner discussed above, it is preferable that the cutting operation be performed while the mask blanks 237 continue to move. Die cutting mechanisms are well known to perform such function inline and at high speeds within a manufacturing operation. Any appropriate cutting mechanism is contemplated depending on the particular system and application and whether the cutting operation is to be performed while the filtration material is moving or not.

Figure 22:
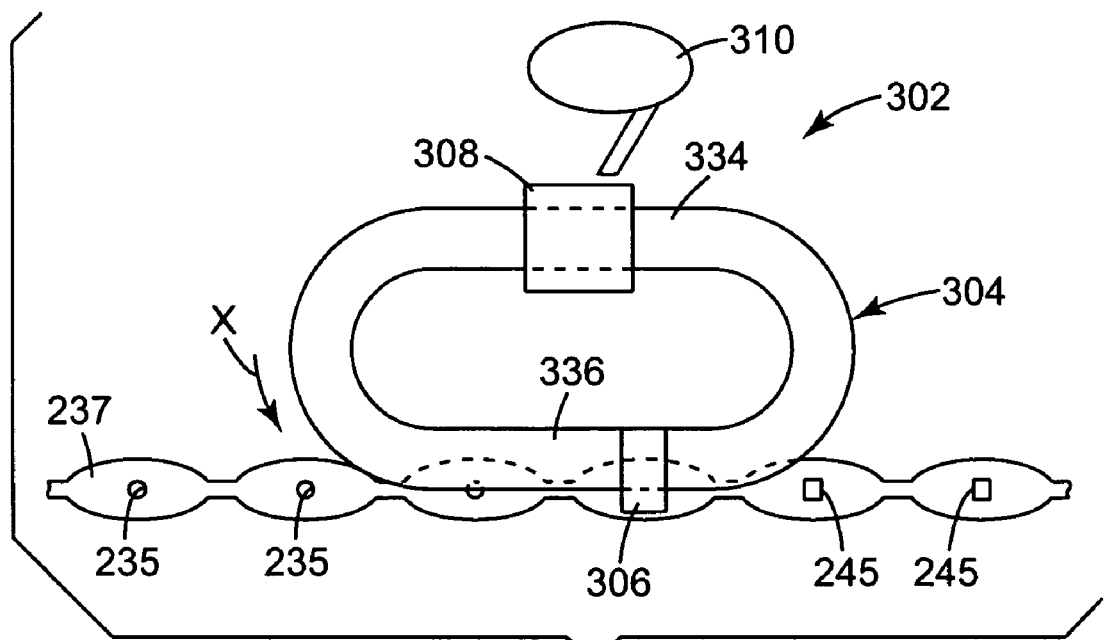
FIG. 22 is a schematic illustration of the portion of the process illustrated in FIG. 21 from a top view.

Once the exhalation valve attachment openings 235 are provided, the respiratory mask blanks 237 are advanced, as shown in FIG. 22, to move adjacent to a valve attaching station 302 that comprises a guiding system 304, a punch and die assembly 306, a valve pick up station 308, and a valve feeder 310. As schematically illustrated in FIG. 21, the guiding system 304 comprises an upper guide track 312 that can be of a conventional construction and that preferably includes a stationary guide track and a transfer mechanism (not shown) that moves along the stationary guide track. Such a transfer mechanism can comprise any conventional or developed mechanism that may include a belt, chain or the like that may be driven in any manner as conventionally known. The guiding system 304 also comprises an upper cam track 314, the purpose of which will be described below. As also schematically illustrated, the guiding system 304 also preferably includes a lower guide track 316 and lower cam track 318, preferably of similar construction as upper guide track 312 and upper cam track 314.

The transfer mechanism portion of the upper guide track 312 is connected with a punch assembly 320 that itself preferably includes an inner punch 322 and an outer punch 324 that are of similar construction as that discussed above with reference to FIGS. 5A through 5E. By this, the punch assembly 320 can be moved at the speed of the transfer mechanism along the upper guide track 312. Moreover, the upper cam track 314 moves the punch assembly 320 to and away from the respiratory mask blanks 237 while they are also moving in the machine direction. Specifically, the upper cam track 314 provides a surface upon which a cam follower 326 rides. The cam follower 326 may comprise a roller, for example, that is rotationally mounted to an end of the punch assembly 320 that itself is constructed to facilitate passage of the cam track 314 and to permit the roller to ride therealong while the punch assembly is moved by the transfer mechanism. As can be seen in FIG. 21, the upper cam track 314 includes a cam portion 315 by which the cam follower 326 and thus the punch assembly 320 are moved toward and away from the respiratory mask blanks 237. This movement is utilized in deforming and attaching an exhalation valve 245 to a respiratory mask blank 237 in the manner described above with reference to FIGS. 5A through 5E. This movement is also facilitated by the punch assembly 320 being slidably mounted to the transfer mechanism of the upper guide track 312.

The transfer mechanism portion of the lower guide track 316 is connected with a die assembly 328 that includes a die portion 330 for supporting a valve component thereon prior to the attaching operation and for also performing the attachment function in cooperation with the punch assembly 320. The die assembly 328 also includes a cam follower 332 that rides along a surface of the lower cam track 318 while the die assembly 328 is moved along the lower guide track 316 by its transfer mechanism (not shown). Like the upper cam track 314, the lower cam track 318 includes a cam portion 319 that causes the die assembly 328 to move to and away from the connected respiratory mask blanks 237, which movement is also utilized in deforming and attaching an exhalation valve 245 to a respiratory mask blank 237. Also, die assembly 328 is slidably connected with the transfer mechanism of the lower guide track 316. In order to effectively perform the attaching operation, the punch assembly 320 and the die assembly 328 are preferably synchronized with each other and driven at similar speeds, and the cam portions 315 and 319 of the upper and lower cam tracks 314 and 318, respectively, are relatively positioned so as to perform the attaching operation. It is preferred, for example, that the cam portion 319 cause the die assembly 328 to begin advancing to its forming position earlier than the punch assembly 320 moves toward its forming position as guided by cam portion 315, and that cam portion 315 cause the punch assembly 320 to retract sooner than die assembly does as guided by cam portion 319. To do this, the cam portion 319 should be longer than cam portion 315 and it should be positioned to extend farther on both sides of the cam portion 315. Of course, depending on any specific forming operation, the cam portions 315 and 319 could be otherwise aligned or positioned with respect to one another so that either side of the forming mechanism can be advanced prior to the other, or that both sides can be advanced at the same time. Moreover, the extent of movement facilitated by the cam portions 315 and 319 is preferably defined so as to provide sufficient movement and force to perform the deformation operation and attachment of the exhalation valve 245 to the mask blanks 237. As above, preferably sufficient force is provided to at least partially compress or crush some of the material making up the respiratory mask blanks 237 to enhance the making of an airtight connection. Like the punch assembly described above with reference to FIGS. 5A–5E, the inner punch 322 is preferably operatively connected with the outer punch 324 by way of a slip or play means, such as a spring (not shown), so that the outer punch 324 can be drivingly connected to the cam follower 326 while the movement of the inner punch 322 can be limited to less movement, such as by the die 330.

A shown in FIG. 22, the guiding system 304 can be provided in an elongated oval shape so as to provide straight portions connected by curved portions. Other shapes are contemplated so long as a particular function desired can be performed. At a first straight portion 334, the valve pick up station 308 is preferably provided, the purpose of which is to load a valve component onto the die 330 while it is moving about the guiding system 304. In conjunction with the valve pick up station 308, the feeder 310 preferably supplies a continuous quantity of components to the valve pick up station 308. The specific mechanisms that are utilized as the valve pick up station 308 and feeder 310 do not form a specific part of the present invention, and it is contemplated that any conventional or developed loading and feeding systems and mechanisms can be utilized in accordance with the present invention. The other straight section 336 preferably is aligned with the machine direction of the respiratory mask blanks 237 so that the attaching operation can be performed in line with the movement thereof. Moreover, the machine speed of the mask blanks 237 should be synchronized to and matched with the speed of the transfer mechanisms of the guiding system 304 so that the die assembly 328 provides a valve component in alignment with the opening 235 of each mask blank 237 and so that the deforming step and attaching operation can be fully conducted along the straight section 336 without stopping. Furthermore, it is contemplated that plural punch and die assemblies (i.e. a combination of a punch assembly 320 with a synchronized die assembly 328) may be provided that are commonly driven along the upper and lower guide tracks 312 and 316, respectively, so that more than one attaching operation may be in progress at the same time along the straight section 336 of the guiding system 304. To facilitate this, the straight section 336 can be appropriately sized.

A method such as described above for attaching exhalation valves 245 through openings 235 of the respiratory mask blanks 237 is particularly preferred because it can be carried out on a continuous basis and at high speeds. The speed of attachment can be easily synchronized with the machine speed of the mask making process. However, any method in accordance with present invention is advantageous in that filtration material or web composite constructions including filtration material can be effectively attached with components in an airtight manner. Moreover, such components can be attached so as to have a neat appearance on the inside of the component about the opening through which it extends because no visible raw edges or weld lines are seen. That is, the deformation process covers the opening edges. In addition, slight misalignment between a component and an opening is hidden and does not detract from the effective seal that the connection produces on both sides of the material. Yet another advantage is that the mechanical clamping that results from such an attachment process will act to hold the web material together. This is particularly advantageous where the web material comprises plural layers or where the web material includes particulate matter embedded therein (such as where a carbon-loaded web is employed) so that the component attachment holds the plural layers together and/or reduces the possibility of particulate loss. This action also facilitates a fluid tight seal between the layers to one another.

To assess the effectiveness of a method in accordance with that described above for attaching an exhalation valve to a respiratory mask, a number of masks of the type shown in FIGS. 12 through 15 were produced in accordance with the process illustrated in FIG. 16. The base portions and extension members of the valve components were formed from a polypropylene material, and the center panels of the respiratory masks were comprised of a layer of BMF material provided between inner and outer cover webs comprised of polypropylene spun-bond non-woven material. The quality of the seal between the component and the center panel of each mask was examined by measuring the amount of an indicator fluid that was able to pass from one side of the respiratory mask to the other when the exhalation valve itself was sealed in a closed position. The exhalation valves tested comprised those of the type illustrated in FIGS. 10 and 11, wherein the flap-type valve was maintained in a closed state for each test. Fluid flow measurements were made using an automated filter tester of the type available, under the trade designation "CertiTest" model 8130 from TSI Incorporated of Shoreview, Minn., USA. With this instrument, the tested masks and valves were found to be comparable with similar masks in which the exhalation valve was attached to the web material by ultrasonic welding.

As noted above, it is also contemplated that any attachment method in accordance with the present invention can be used to attach any component to any filtration material or respiratory mask after the material or mask has been fully formed. As with the molded respiratory mask illustrated in FIG. 23, for example, the exhalation valve 100 may be attached to the respiratory mask 104 after it is pre-formed into its cup shape body for use to cover the mouth and nose of a wearer. Such pre-formed masks are known and described, for example, in U.S. Pat. No. 5,307,796. Typically, the mask body comprises at least one layer of filtration material and a shaping layer that provides supporting structure to the mask body and for supporting the filter layer. The shaping layer can be made from any suitable material, for example, a non-woven web of thermally bondable fibers that are molded using conventional procedures into the cup shaped configuration. Typical features include the illustrated headband straps and a nose clip. In any case, an exhalation aperture (not shown) is provided either before or after the molding process so that the exhalation valve 100 can be attached using a method in accordance with the present invention either prior to or after the molding process.

Figure 24:
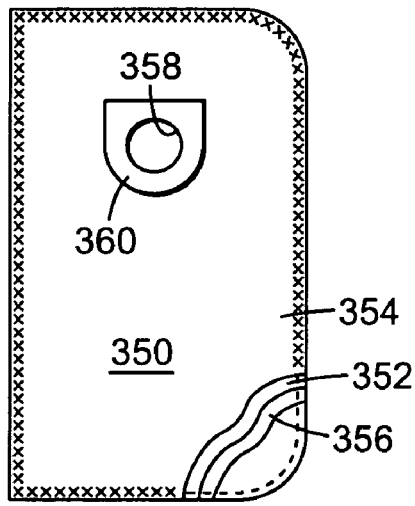
FIG. 24 shows a filter bag of the type usable within a vacuum cleaner including a component attached through an opening of the filter bag material, wherein the component can be attached to the filter bag by a method in accordance with present invention.

Any method in accordance with a present invention can also be used to secure other components to filtration material intended for use in other fields than respiratory masks. For example, in FIG. 24, air filtration material is illustrated that is formed into a filter bag 350 for use in a vacuum cleaner. Such filter bags are well known and may be formed from paper or other material that is pervious to the flow of air. Multi-layer fabrics are also well known. As illustrated, the filter bag 350 comprises a filtration material layer 352 provided between fabric support layers 354 and 356. An inlet 358 is defined through the filter bag 350 that includes a component 360 that enables the filter bag 350 to be attached to the outlet of a vacuum cleaner in a conventional manner. The component 360 can be advantageously secured in position by any method in accordance with the present invention, and to that end, the component 360 is provided with an integral deformable extension member (not shown), like extension member 16 described above, that is utilized in the attachment operation. The component 360 could be secured to the filtration material before it is formed into the bag or after depending upon the manner of production thereof.

Figure 25:
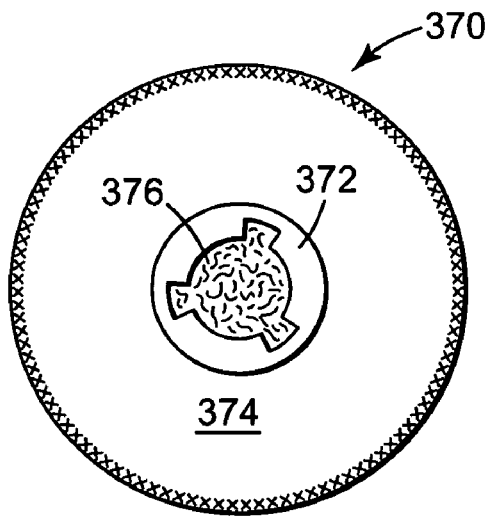
FIG. 25 is a view from one side of an air filter that can be used with a respiratory mask including a component attached to the air filter by a method in accordance with the present invention.

Yet another filter device is illustrated in FIG. 25 which comprises a filter 370 having an attachment component 372 connected therewith. The illustrated filter 370 comprises a disposable filter that is intended to be releasably attached to a re-usable respiratory mask. The filter 370 is disc-shaped and comprises a circular piece of a multi-layer web material that is seamed, preferably by welding, around its circumference. Such web material typically comprises a microfiber layer positioned between layers of spun-bond material, which form the outer surfaces of the filter 370. Filters of the general type shown in FIG. 25 are known, and one such example is commercially available under the trade designation "2040 High Efficiency Filter," from Minnesota Mining and Manufacturing Company of St. Paul, Minn. The attachment component 372 is preferably connected to one of the outer layers of the spun-bond material. Thus, it is further preferable that the attachment component 372 be connected to one of the outer layers prior to its combination with the inner micro-fiber layer. Specifically, as shown in FIG. 25, a spun bond layer 374 includes a central opening to which the attachment component 372 is attached. A micro-fiber layer 376 is visible inside of the openings of both the spun bond layer 374 and the attachment component 372. In accordance with the present invention, the attachment component 372 includes an extension member that can be positioned through the opening of the spun bond layer 374 and can be deformed against its back surface. The attachment component 372 itself would otherwise include whenever additional features are desired for it to be releasably connectable with its respiratory mask or other item.

Any number of different filtration devices and materials are contemplated where there is a need to attach a component to the filtration material or any composite web having such a filtration material therein. As above, the inclusion of filtration material requires that a component be attached in a way to secure it in place and to provide an effective seal so as not to have a deleterious effect on the filters' purpose. That is, the attachment should not permit significant contaminants to be able to pass through it such that the fluid filtering is compromised. Other methods of attachment are also contemplated in accordance with the present invention for attaching any component that includes a deformable portion provided on one side of a web including filtration material and where the deformable portion can be utilized in conjunction with a base portion provided on the other side of the web so that a mechanical clamped attachment results.

The invention claimed is:

1. A method for making a filtering face mask comprising:
providing a fluid-permeable multi-layered mask body comprising a structural supporting layer and a filtration layer, the multi-layered mask body being configured to fit over the nose and mouth of a person and having an aperture disposed therein;
providing an exhalation valve comprising a base portion and a deformable hollow plastic extension member that extends from the base portion to a tip;
inserting the tip through the aperture; and
deforming the extension member so as to make an effective seal between the exhalation valve and the mask body.

2. The method of claim 1, comprising loading the exhalation valve onto a die of a cooperating punch and die system and supporting at least a portion of the base portion on an anvil portion of the die.

3. The method of claim 2, comprising deforming the extension member by advancing the punch so as to contact the extension member.

4. The method of claim 3, comprising advancing the punch so that at least a surface portion of the deformed extension member abuts against the mask body.

5. The method of claim 1, comprising deforming a portion of the extension member to extend radially outward from the aperture.

6. The method of claim 1, comprising compressing a portion of the mask body between a portion of the extension member and the base portion.

7. The method of claim 1, comprising mechanically clamping a portion of the mask body between a portion of the extension member and the base portion.

8. The method of claim 1, comprising providing a seal enhancing substance between the exhalation valve and the mask body.

9. The method of claim 1, comprising deforming the extension member using a cold forming process.

10. The method of claim 9, wherein the extension member is capable of plastically yielding but not breaking during cold forming.

11. The method of claim 1, wherein the extension member comprises polypropylene.

12. The method of claim 1, comprising deforming the extension member using a thermal forming process.

13. The method of claim 1, wherein the extension member comprises a thermoplastic material.

14. The method of claim 1, wherein the extension member comprises polystyrene.

15. The method of claim 1, wherein the extension member comprises styrene-butadiene copolymer.

16. The method of claim 15, comprising turning a portion of the mask body adjacent the aperture along the outer wall.

17. The method of claim 1, wherein the extention member is round as viewed in cross-section.

18. The method of claim 1, wherein the extension member and aperture have noncircular shapes so as to prevent rotation of the exhalation valve relative to the mask body.

19. The method of claim 1, wherein a gripping feature on the exhalation valve extends into the mask body to prevent rotation of the exhalation valve relative to the mask body.

20. The method of claim 1, wherein the extension member has an outer wall with an outer diameter and the aperture is sized smaller than the outer diameter.

21. The method of claim 1, wherein the base portion completely surrounds the aperture.

22. The method of claim 1, wherein the mask body is cup-shaped.

* * * * *